(12) United States Patent
Fair et al.

(10) Patent No.: US 7,315,883 B2
(45) Date of Patent: Jan. 1, 2008

(54) SYSTEM AND METHOD FOR MAILING LIST MEDIATION

(75) Inventors: Allen M. Fair, King of Prussia, PA (US); Omar L. Thameen, New York, NY (US)

(73) Assignee: Biglist, Inc., Media, PA (US)

( * ) Notice: Subject to any disclaimer, the term of this patent is extended or adjusted under 35 U.S.C. 154(b) by 314 days.

(21) Appl. No.: 10/884,277

(22) Filed: Jul. 2, 2004

(65) Prior Publication Data

US 2006/0004736 A1    Jan. 5, 2006

(51) Int. Cl.
G06F 15/16 (2006.01)
G06F 7/00 (2006.01)
G06F 17/00 (2006.01)

(52) U.S. Cl. .......................... 709/206; 707/1; 707/102
(58) Field of Classification Search .................... 707/1, 707/102; 709/206
See application file for complete search history.

(56) References Cited

U.S. PATENT DOCUMENTS

| | | | |
|---|---|---|---|
| 5,826,022 A * | 10/1998 | Nielsen | 709/206 |
| 5,864,684 A * | 1/1999 | Nielsen | 709/206 |
| 6,052,709 A | 4/2000 | Paul | |
| 6,167,435 A * | 12/2000 | Druckenmiller et al. | 709/206 |
| 6,212,552 B1 | 4/2001 | Biliris et al. | |
| 6,282,565 B1 | 8/2001 | Shaw et al. | |
| 6,311,211 B1 | 10/2001 | Shaw et al. | |
| 6,356,936 B1 | 3/2002 | Donoho et al. | |
| 6,366,913 B1 | 4/2002 | Fitler, Jr. et al. | |
| 6,438,608 B2 | 8/2002 | Biliris et al. | |
| 6,460,050 B1 | 10/2002 | Pace et al. | |
| 6,480,885 B1 | 11/2002 | Olivier | |
| 6,487,583 B1 | 11/2002 | Harvey et al. | |
| 6,519,629 B2 | 2/2003 | Harvey et al. | |
| 6,547,134 B2 | 4/2003 | Ogilvie | |
| 6,594,693 B1 * | 7/2003 | Borwankar | 709/219 |

OTHER PUBLICATIONS

L-Soft International, Inc., General User's Guid for LISTSERV, version 1.8c, Dec. 1996, L-Soft International.*

(Continued)

*Primary Examiner*—Apu Mofiz
*Assistant Examiner*—Brent Stace
(74) *Attorney, Agent, or Firm*—Fay Kaplun & Marcin, LLP

(57) ABSTRACT

Described is a method for generating a dynamic mailing list with the following steps: (a) comparing a source mailing list to an established mailing list, the source mailing list including a mailing address to which a sender desires to send a message; (b) when the mailing address is included in the established mailing list, making a preliminary determination to add the mailing address to the dynamic mailing list; and (c) when the mailing address is not included in the established mailing list, processing the mailing address according to a procedure defined by an add rule for adding the mailing address to the established mailing list. Also described is a system with the following components: (a) a storage arrangement; and (b) a processing arrangement obtaining (i) a source mailing list including a mailing address to which a sender desires to send a message and (ii) an add rule which determines whether the mailing address is to be added to an established mailing list, the processing arrangement storing the source mailing list, the established mailing list and the add rule in the storage arrangement, wherein when the mailing address is included in the established mailing list, the processing arrangement makes a preliminary determination to add the mailing address to the dynamic mailing list, and wherein when the mailing address is not included in the established mailing list, the processing arrangement processes the mailing address according to the add rule.

48 Claims, 14 Drawing Sheets

OTHER PUBLICATIONS

MIT, "MIT Mailmain User Guide: General Options" Jun. 2003, MIT (http://web.archive.org/web/20030620190432/http://web.mit.edu/lists/mailman/general.html).*

D. Brent Chapman, "Majordomo: How I Manage 17 Mailing Lists Without Answering -request Mail" Oct. 1992, LISA VI.*

MIT "MIT Mailman User Guide: Subscriber Options/Membership Management" Jun. 2003, MIT (http://web.archive.org/web/20030620192304/http://web.mit.edu/lists/mailman/subscriber.html).*

* cited by examiner

Table J: List Join Rules

| | Status = "Not Subscribed" | | |
|---|---|---|---|
| | Unsubscribed (Former) | Known | New |
| | | Add Without Notice | |
| List Join Rule | | | |
| 1. Add Silently | Welcome | Welcome | Welcome |
| 2. Welcome All | Invite | Invite | Invite |
| 3. Invite All | Invite | Welcome | Welcome |
| 4. Invite Former Subscribers and Welcome Others | Drop | Welcome | Welcome |
| 5. Drop Former Subscribers and Welcome Others | Invite | Invite | Welcome |
| 6. Welcome New Addresses and Invite Others | Drop | Drop | Welcome |
| 7. Welcome New Addresses and Drop Others | Drop | Invite | Invite |
| 8. Drop Former Subscribers and Invite Others | Drop | Drop | Invite |
| 9. Invite New Addresses and Drop Others | | | |
| 10. Subscriber Initiation Required | No welcomes or invites allowed | | |

FIG. 6

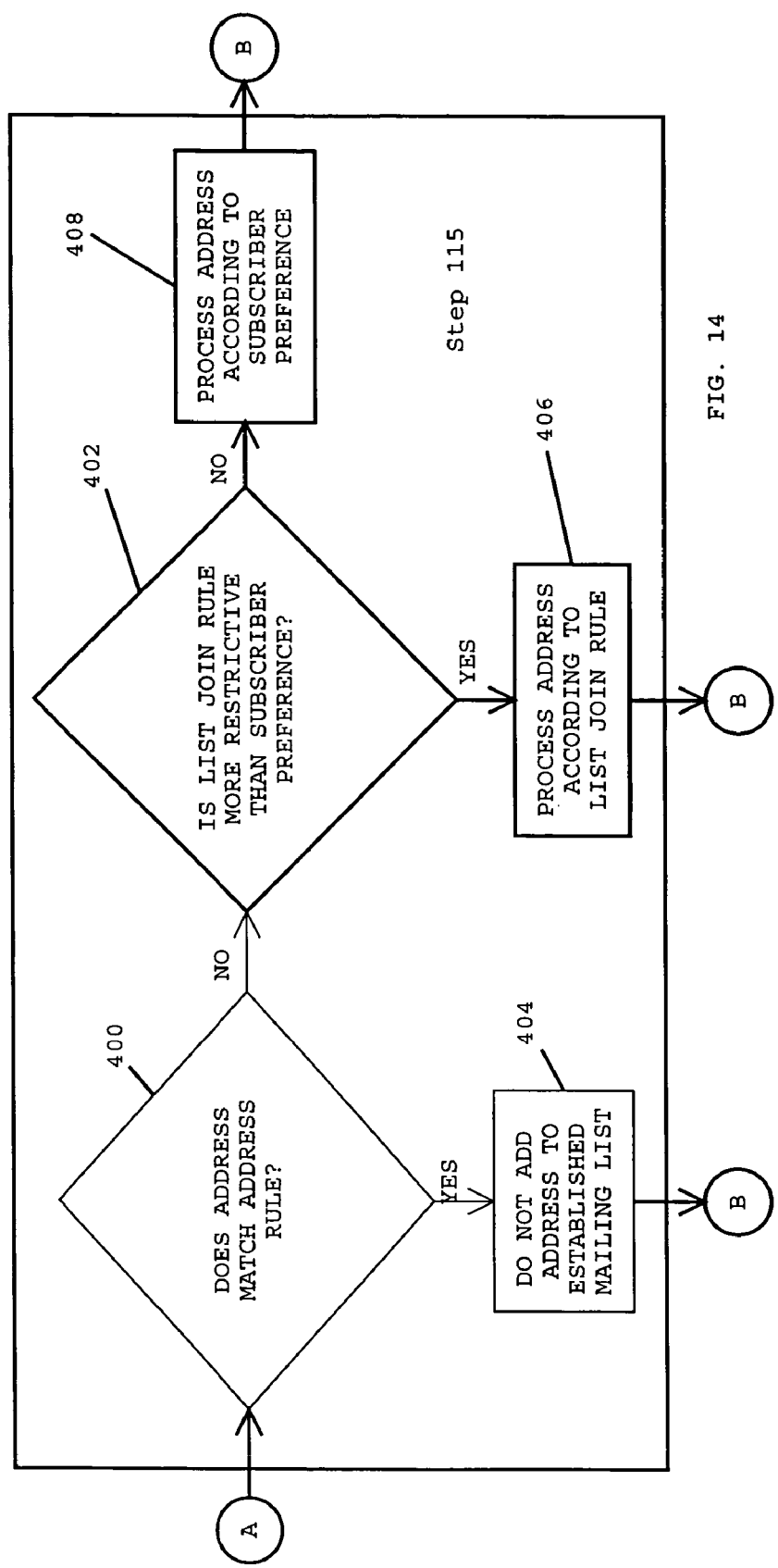

SYSTEM AND METHOD FOR MAILING LIST MEDIATION

FIELD OF THE INVENTION

The present invention relates to a system and method for mass mailing and managing mailing lists. More specifically, the present invention relates to a system for managing mailing lists, such as email lists, that mediates and integrates the needs and requirements of parties involved in the delivery of mailing list messages.

BACKGROUND INFORMATION

Mailing lists have traditionally been used by information providers to disseminate information to groups of people. An information provider is anyone with a message, including individuals, companies, and organizations, and a mailing list comprises contact information, e.g., postal addresses and telephone numbers, of the people whom the information provider wishes to reach with its message, e.g., advertisement, sales brochure, stock tip, newsletter, or holiday greeting.

With the advent of the Internet and email (also "e-mail" or "electronic mail"), a specialized form of mailing list has emerged, called an email list or emailing list, which includes a list of email addresses. Rather than sending a printed letter or brochure via postal mail, the information provider simply sends an email message to subscribers of the email list.

There are obstacles to successful delivery of list messages arising from competing interests between the parties involved, including list owners, list subscribers, and intermediate recipients. In the case of email lists, an intermediate recipient is typically an Internet Service Provider (ISP). Consequently, a need exists for a system and method for mediation between these parties.

SUMMARY OF THE INVENTION

The present invention relates to a method for generating a dynamic mailing list, comprising the steps of: (a) comparing a source mailing list to an established mailing list, the source mailing list including a mailing address to which a sender desires to send a message; (b) when the mailing address is included in the established mailing list, making a preliminary determination to add the mailing address to the dynamic mailing list; and (c) when the mailing address is not included in the established mailing list, processing the mailing address according to a procedure defined by an add rule for adding the mailing address to the established mailing list.

The present invention also relates to a system, comprising: (a) a storage arrangement; and (b) a processing arrangement obtaining (i) a source mailing list including a mailing address to which a sender desires to send a message and (ii) an add rule which determines whether the mailing address is to be added to an established mailing list, the processing arrangement storing the source mailing list, the established mailing list and the add rule in the storage arrangement, wherein when the mailing address is included in the established mailing list, the processing arrangement makes a preliminary determination to add the mailing address to the dynamic mailing list, and wherein when the mailing address is not included in the established mailing list, the processing arrangement processes the mailing address according to the add rule.

BRIEF DESCRIPTION OF THE DRAWINGS

FIG. 6 shows Table J, which shows several list join rules according to the present invention.

FIG. 14 shows another exemplary embodiment of step 115 of the method shown in FIG. 3, wherein the add rule is an address rule, a list join rule, and a subscriber preference.

DETAILED DESCRIPTION

The present invention relates to a system and method for building or generating a dynamic mailing list from an established mailing list and a source mailing list provided by a sender or list owner.

Figure 1:
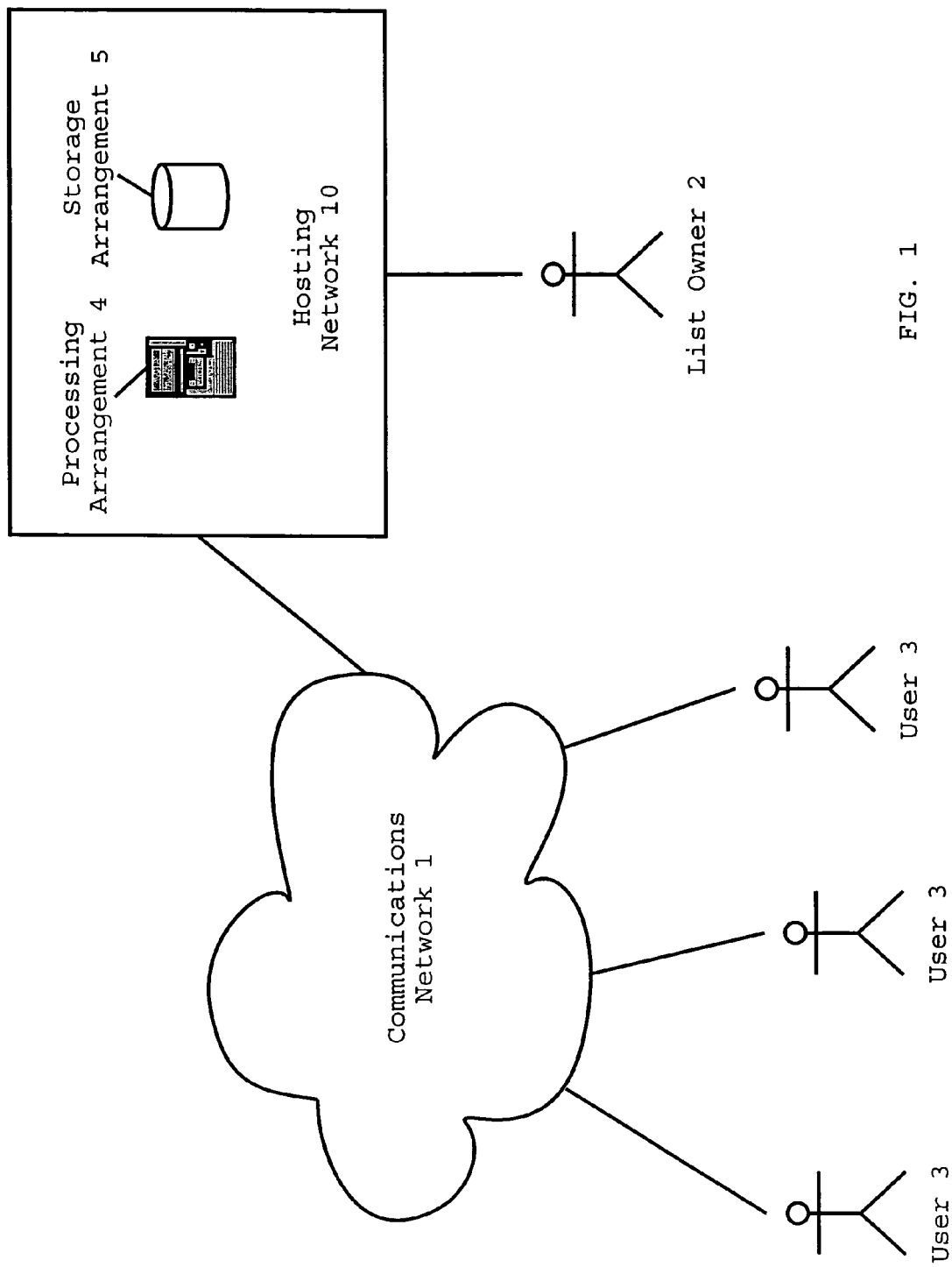
FIG. 1 shows an exemplary embodiment of a system according to the present invention.

FIG. 1 shows an exemplary embodiment of a system according to the present invention. As shown in FIG. 1, communications network 1 connects users 3 to hosting network 10, which in turn is connected to list owner 2. List owner 2 may desire to manage a mailing list hosted on hosting network 10, to which users 3 may choose to subscribe. Hosting network 10 includes processing arrangement 4 and storage arrangement 5. In a preferred embodiment, processing arrangement 4 includes a server and processing software, and storage arrangement 5 includes a database. Hosting network 10 also may include a delivery server (not shown) for delivery of list messages.

List owner 2 may be any sender of messages, who has at least one mailing list hosted on hosting network 10. Users 3 may be anyone with access to communications network 1. Users 3 include both subscribers and potential subscribers of the list owner's mailing list(s). Users 3 may access communications network 1 through personal computers, PDA's, phones, or other devices known in the art.

One embodiment of the present invention relates specifically to email lists. In this embodiment, communications network 1 is the Internet, to which list owner 2 also may be directly connected. In this embodiment, list owner 2 and each user 3 has an email account, which enables the sending and receiving of email to and from hosting network 10. In other embodiments, communications network 1 may be a Local Area Network, a Wide Area Network, or other network known in the art.

Other embodiments of the present invention relate to lists of other types of communication accounts such as cellular phone numbers, wireless pager accounts, and instant messaging accounts, including ICQ numbers and AOL (or other ISP) messenger accounts.

In one such embodiment, communications network 1 may be a digital cellular system, wherein users 3 have access to cell phones. In this embodiment, users 3 access communications network 1 by means of various message services or mechanisms such as Short Message Service (SMS), Enhanced Message Service (EMS), and Multimedia Message Service (MMS).

In another embodiment, communications network 1 is the Internet and instant messaging servers connect hosting network 10 to communications network 1. In this embodiment, users 3 access communications network 1 by means of their instant messaging accounts.

Figure 2:
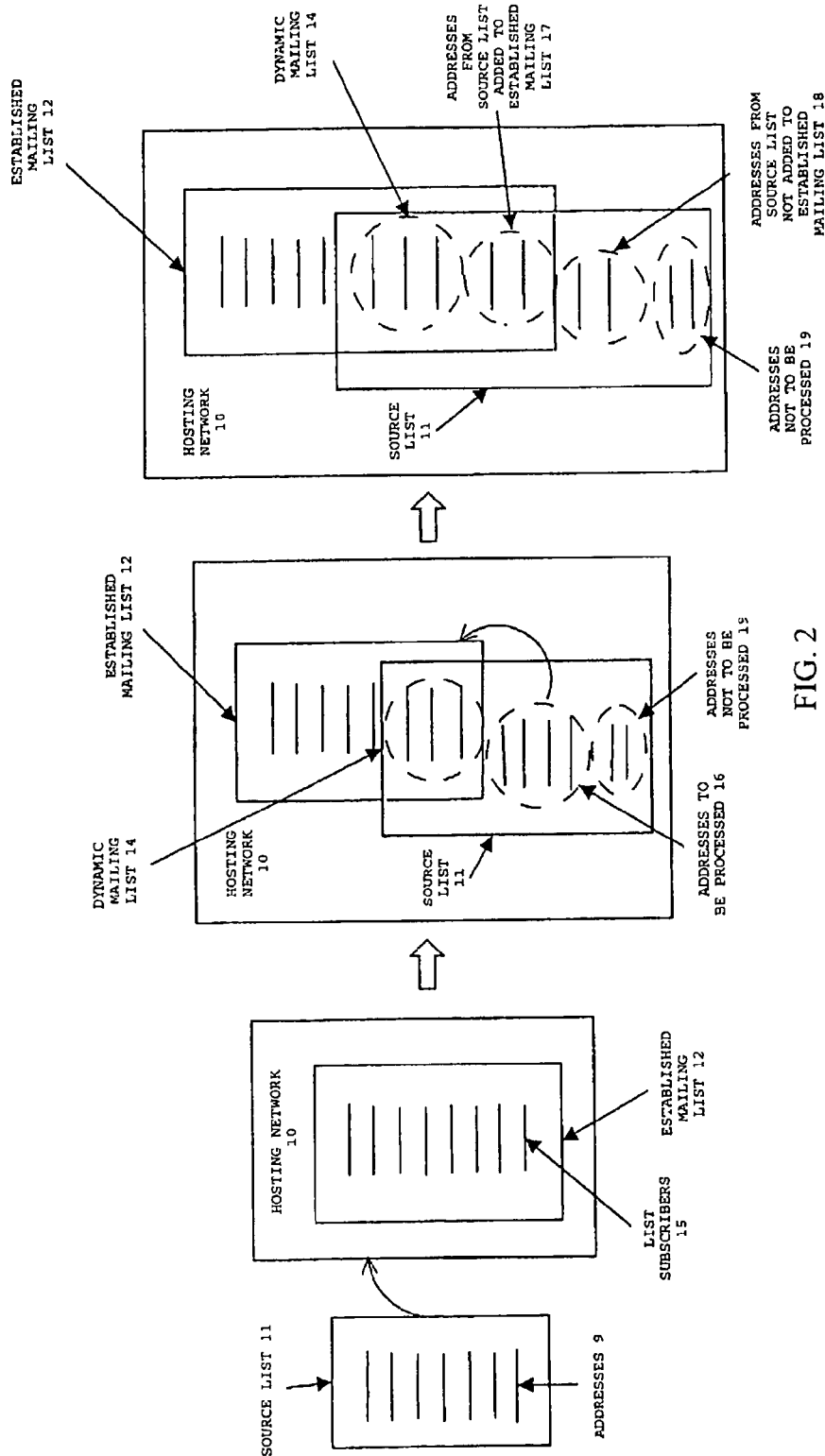
FIG. 2 shows a schematic representation of an exemplary embodiment of a method according to the present invention.

FIG. 2 shows a schematic representation of an exemplary embodiment of the method according to the present invention. Referring to FIGS. 1 and 2, established mailing list 12 is hosted on hosting network 10. Hosting an mailing list is known in the art and involves, at the least, storing a mailing address, e.g., an email address, associated with each list subscriber on storage arrangement 5 of hosting network 10. Established mailing list 12 includes at least one list subscriber 15.

Hosting network 10 accepts source list 11 from list owner 2. Source list 11 comprises all addresses 9 to which the list owner or sender wants to send a list message. Source list 11 has at least one mailing address 9, but in most cases, will include several addresses.

As described below in more detail, dynamic mailing list 14 is generated from addresses 9 that are also list subscribers 15 of established mailing list 12, as shown in FIG. 2. Other addresses 9 that are not added to dynamic mailing list 14 are either processed for possible addition to established mailing list 12 as shown at 16 or not processed for possible addition to established mailing list 12 as shown at 19. Under certain circumstances detailed below, some addresses are added to established mailing list 12 as shown at 17 and some addresses are not added to established mailing list 12 as shown at 18.

In the preferred embodiment, sender or list owner 2 may then send a mailing message to dynamic mailing list 14. This may be done through hosting network 10. Alternatively, list owner 2 may download dynamic mailing list 14 for later use.

Figure 3:
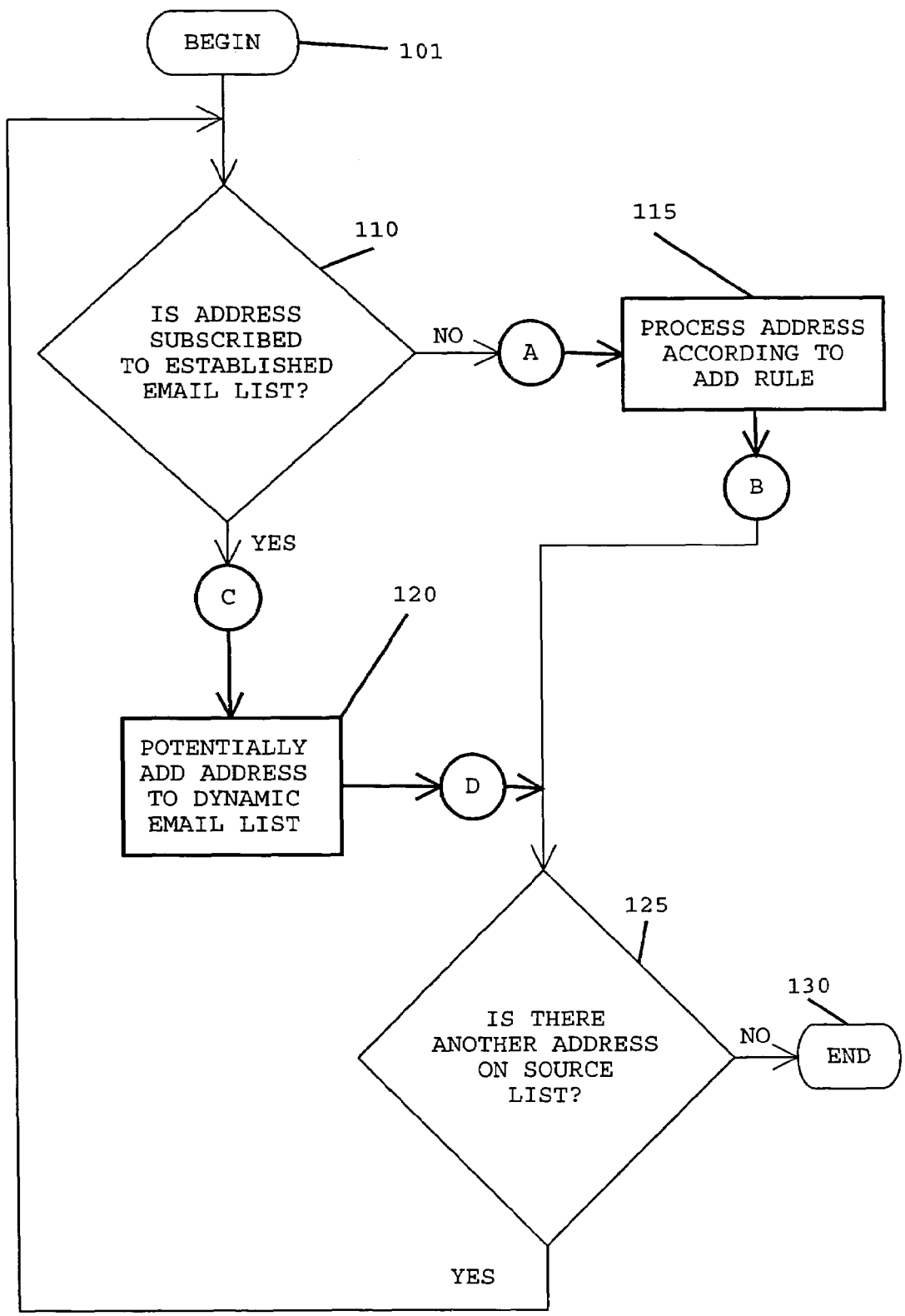
FIG. 3 shows an exemplary embodiment of a method according to the present invention, including use of an add rule.

FIG. 3 shows an exemplary embodiment of the method according to the present invention. The method begins at the terminal labeled 101 and ends at the terminal labeled 130. In FIG. 3, it is determined whether mailing address 9 from source list 11 is included in or subscribed to established mailing list 12 (step 110). Mailing address 9 will be added to dynamic mailing list 14 only if it is included in established mailing list 12 (step 120). However, as explained in detail below, under certain circumstances, a mailing address that is included in or subscribed to established mailing list 12 will not be added to dynamic mailing list 14. In other words, not all email addresses 9 that are included in established email list 12 will be added to dynamic email list 14.

If mailing address 9 from source list 11 is not included in established mailing list 12, it will be processed according to an add rule for possible addition to established mailing list 12 (step 115). Additional details of step 115 are described below. The processing continues for each address 9 on source list 11 (step 125). Processing continues until there are no additional addresses from source list 11 to be processed.

Processing Actions According to Add Rule

According to the add rule, mailing address 9 either may be added to established mailing list 12 or not added to established mailing list 12. Adding mailing address 9 to established mailing list 12 includes one of the following processing actions: (1) add without notice; or (2) welcome action. Not adding mailing address 9 to established mailing list 12 includes one of the following processing actions: (3) invite action; and (4) drop action.

"Add without notice" means that mailing address 9 from source list 11 is added to established mailing list 12 quietly or without notification to the owner of mailing address 9 (hereinafter "mailing address owner" or "mailing addressee").

The "welcome action" means that mailing address 9 from source list 11 is added to established mailing list 12 and a notification of the addition is sent to mailing address 9, i.e., the address is welcomed. In the preferred embodiment, this notification or welcome message is a message containing information about established mailing list 12. At a minimum, the welcome message includes instructions on how to unsubscribe from established mailing list 12.

The "invite action" means that mailing address 9 from source list 11 is not added to established mailing list 12 but instead is sent an invitation to join or subscribe to established mailing list 12, i.e., the address is invited. In the preferred embodiment, the invitation is a message, which contains both information about established mailing list 12 and instructions on how to subscribe to established mailing list 12. For example, for an email list, the invitation may be an email message containing a reply-to address with a subscribe command so that replying to the invitation will add or subscribe the email address to the established email list. Alternatively, the invitation may contain a web link that the addressee may click to subscribe to the established email list. If the addressee does not respond to the invitation, the mailing address is not added to the established email list.

The "drop action" means that mailing address 9 from source list 11 is not added to established mailing list 12, and is not invited to join established mailing list 12, i.e., the address is dropped.

The processing actions described above do not necessarily preclude other methods for subscribing addresses to established mailing list 12. For example, an individual may be allowed to subscribe himself to an established email list by means of a web form or by email. These and other methods of subscribing to an email list are known in the art.

Add Rule

The add rule determines which mailing address 9 may be added to established mailing list 12. In particular, the add rule encompasses one or more rules for determining which mailing addresses 9 may be added to established mailing list 12. These include: (1) an address rule based on mailing address 9 or data associated with mailing address 9; (2) list join rule based on a status of mailing address 9; and (3) subscriber preference based on an individual preference of the mailing address owner.

These add rules use different criteria for determining which mailing address may be added to established mailing list 12. For the address rule, it is the mailing address itself or data associated with mailing address 9. For the list join rule, it is the status of mailing address 9, and for the subscriber preference, it is the registered preference of the subscriber or owner of mailing address 9.

Add Rule: Address Rule

Figure 4:
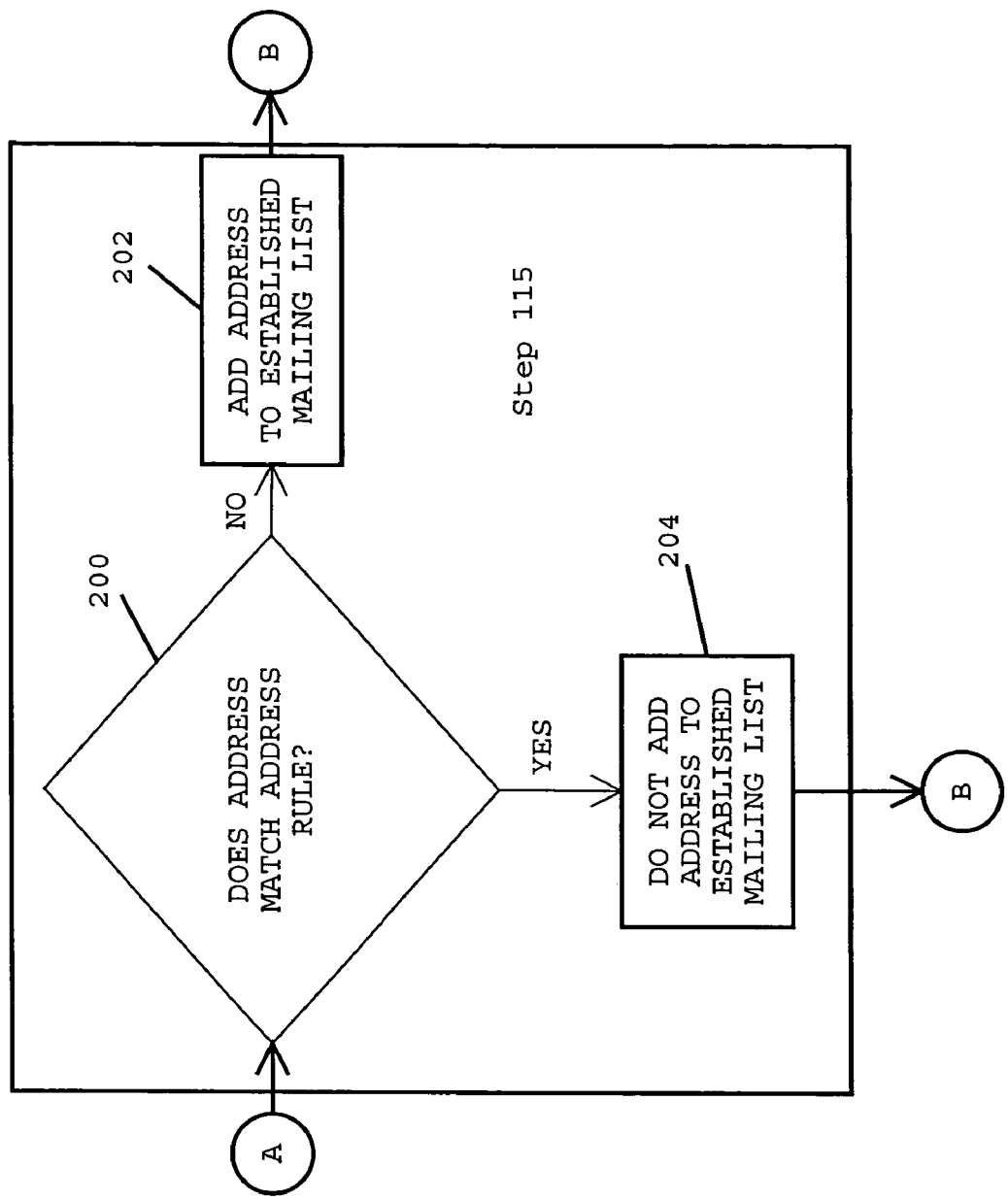
FIG. 4 shows an exemplary embodiment of step 115 of the method shown in FIG. 3, wherein the add rule is an address rule.

FIG. 4 shows an exemplary embodiment of step 115 shown in FIG. 3. In this embodiment, the add rule is an address rule, which determines whether mailing address 9 may be added to established mailing list 12 based, in part or in whole, on the mailing address itself.

Mailing addresses typically comprise a string of characters. For example, the most common type of email address includes a user name (i.e., the "local part") and an Internet domain name (i.e., the "domain part"), separated by the "@" sign. An example of such an email address is "janedoe@widget.com", wherein "janedoe" is the user name and "widget.com" is the domain name.

As another example, user name or screen names for instant messaging accounts also comprise a string of characters, such as "mooboynyc" or "biglistinc".

An address rule comprises at least one string of characters, wherein each string comprises at least one character. For example, an address rule may comprise the following: "a". As another example, an address rules may comprise the following: "f", "johndoe", "widget.org", and "edu".

In step 200 of FIG. 4, it is determined whether mailing address 9 from source list 11 matches an address rule. This means that one of the strings of the address rule is found in mailing address 9. The match may be determined on a case sensitive or case insensitive basis.

If mailing address 9 matches the address rule, then it is not added to established mailing list 12 (step 204). This mailing address 9 may be invited or dropped. If mailing address 9 does not match the address rule (step 200), then it is added to established mailing list 12 (step 202). This mailing address 9 may be added without notice or welcomed.

Table A below illustrates how an address rule works with regard to email lists, wherein mailing address is an email address and the address rule comprises: "f", "johndoe", "widget.org", and "edu". The mailing addresses janedoe@widget.com and xyz@domain.org do not match the address rule since these mailing addresses do not include any of the strings of the address rule. These mailing addresses are added to the established email list (step 202 of FIG. 4), i.e., these addresses may be added without notice or welcomed. The mailing addresses pxca884exfi@company.com, nospam@johndoe.net, and educator@university.com match the address rule: pxca884exfi@company.com includes the string "f", nospam@johndoe.net includes the string "johndoe", and educator@university.com includes the string "edu". These mailing addresses are not added to the established email list (step 204 in FIG. 4), i.e., these mailing addresses may be invited or dropped.

TABLE A

Address Rule: f, johndoe, widget.org, edu

| Email Address | Match Address Rule? | Add to Established Email List? |
|---|---|---|
| janedoe@widget.com | NO | YES |
| pxca884exfi@company.com | YES | NO |
| xyz@domain.org | NO | YES |
| nospam@johndoe.net | YES | NO |
| educator@university.com | YES | NO |

There are different types of address rules as contemplated by the present invention. The address rule may be a network hosting rule, a list owner rule, or both. Whereas a list owner rule is manipulable by the list owner or sender, a network hosting rule is not. In a preferred embodiment, hosting network 10 is operated by a list host independently of list owner 2, and whereas the list owner rule is set by list owner 2, the network hosting rule is set by the list host. The list owner rule may be set by means of a list owner interface as depicted in FIG. 1. For email lists, the list owner interface may be a web interface.

TABLE B

Address Rules:
(a) Network Hosting Rule: jane, john
(b) List Owner Rule: edu, com

| Email Address | Match Address Rule? | Add to Established Email List? |
|---|---|---|
| janedoe@widget.com | YES | NO |
| pxca884exfi@company.com | YES | NO |
| xyz@domain.org | NO | YES |
| nospam@johndoe.net | YES | NO |
| educator@university.com | YES | NO |

For example, as shown in Table B above, the address rule comprises both: (a) a network hosting rule; and (b) a list owner rule. The network hosting rule comprises "jane" and "john", and the list owner rule comprises "edu" and "com". In this example, any email address that contains any of the strings in either the network hosting rule or the list owner rule matches the address rule. The email address xyz@domain.org does not match the address rule since this email address does not include any of the strings of the address rule. This email address is added to established email list (added without notice or welcomed) as shown at 202 in FIG. 4. The email addresses janedoe@widget.gov, pxca884exfi@company.com, nospam@johndoe.net, and educator@university.com match the address rule: janedoe@widget.gov includes the string "jane", pxca884exfi@company.com includes the string "com", nospam@johndoe.net includes the string "john", and educator@university.com includes the string "edu". These email addresses are not added to the established email list (invited or dropped) as shown at 204 in FIG. 4.

Hosting network 10 may host more than one mailing list, which may be owned by more than one list owner. A list owner rule applies only to list(s) owned by the list owner; it may apply only to specific lists or subset of lists owned by the list owner or to all lists owned by the list owner. On the other hand, a network hosting rule may apply to a broader subset of lists, including lists owned by more than one list owner or all lists hosted on hosting network 10.

Address rules may be used by the list host and list owner to control subscribership. If, for example, an ISP or company prohibits its users from joining a hosted email list, the ISP domain name or the company domain name may be added to the network hosting rule or the list owner rule. In addition, the list host or the list owner can include a specific address or domain to the address rule because the address should not be placed on any mailing list. Also, an address may be added to the address rule if the addressee has complained to the list host or list owner about a list.

In an alternative embodiment, source list 11 may include other data, in addition to the mailing address itself, that is associated with each mailing address 9. For example, this data may include name, address, gender, age, etc., as may be appreciated by anyone familiar with databases. For an email address, subscriber data also may include the mail exchanger for the email address, which may be the host name or IP address. In such an embodiment, the address rule comprises data, e.g., one or more character(s) or value(s), to be matched against the data associated with a mailing address rather than the mailing address itself. In this way, the list host or list owner can prevent additional types of mailing addresses from being added to established mailing list 12. For example, addresses belonging to people under the age of 18 may be barred.

Add Rule: List Join Rule

In another embodiment, the add rule is a list join rule, which determines whether mailing address 9 on source list 11 may be added to established mailing list 12 based on the status of mailing address 9. In this embodiment, the status reflects whether or not mailing address 9 is included in established email list 12.

TABLE C

Status of Mailing Address

Subscribed
Not Subscribed

TABLE D

Subscribed Status

Active
Inactive

TABLE E

Not Subscribed Status

Known
New

TABLE F

Not Subscribed Status

Unsubscribed (Former)
Known
New

In one embodiment shown in Table C above, the status is either (1) subscribed to or included in established mailing list 12 or (2) not subscribed to or included in established mailing list 12. Only mailing addresses 9 that are included in established mailing list 12 are added to dynamic list 14.

In one embodiment, mailing addresses 9 that are not included in established mailing list 12 may be processed by being silently added to established mailing list 12. In the preferred embodiment, mailing addresses 9 that are not included in established mailing list 12 will be processed with either the drop action, the welcome action, or the invite action.

In another embodiment as shown in Table D above, the status "subscribed" is further subdivided into (1) active, wherein mailing address 9 is included in established mailing list 12 and is receiving mailing messages, and (2) inactive, wherein mailing address 9 is included in established mailing list 12 but is not receiving mailing messages. In the case of email, an address may be inactive if the address owner has abandoned the address, if messages to the address are blocked or are returned or bouncing, or if the addressee has temporarily suspended his list subscription, i.e., put his address on vacation. These and other examples of an inactive address are known in the art.

Figure 5:
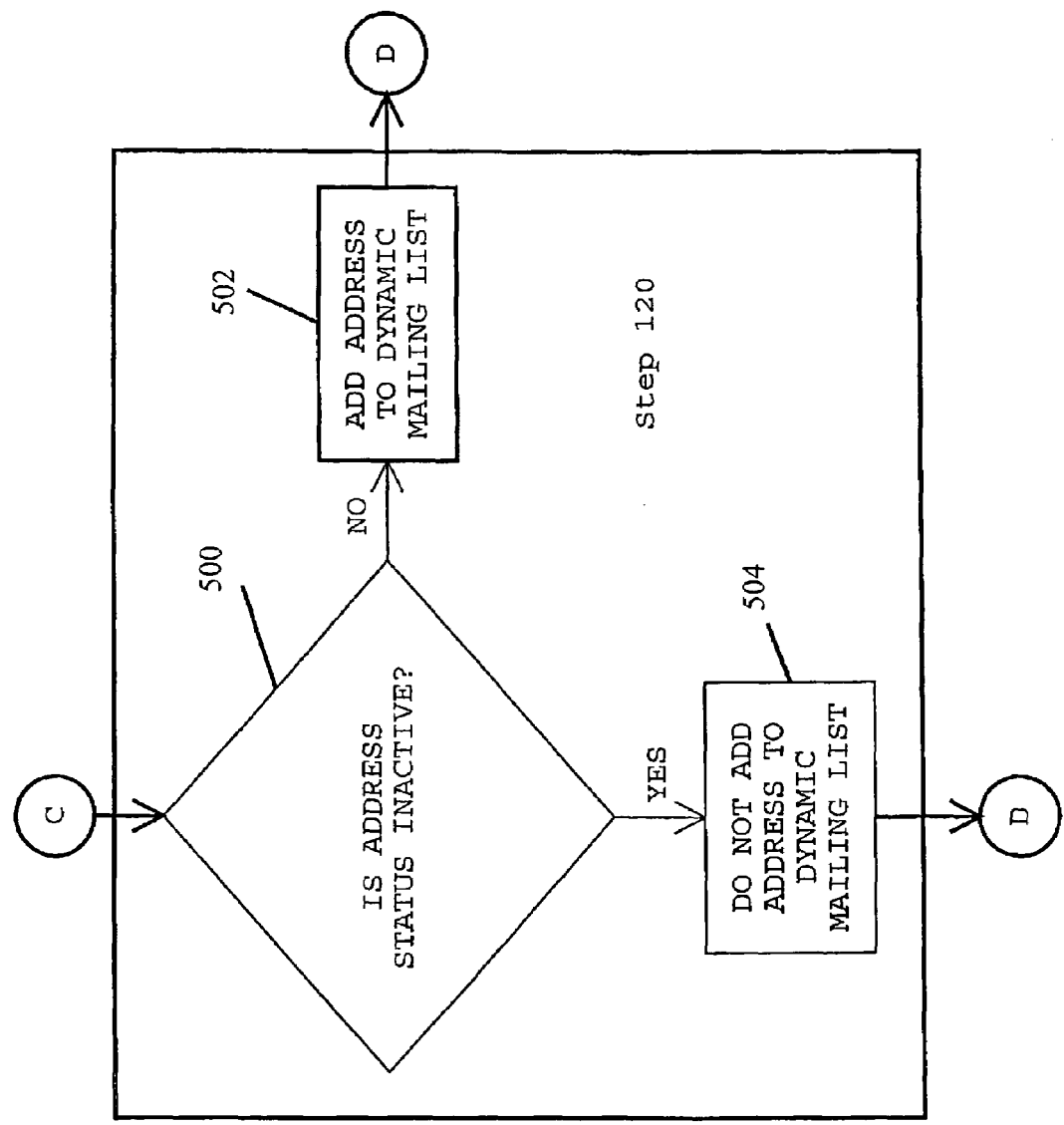
FIG. 5 shows an exemplary embodiment of step 120 of the method shown in FIG. 3, relating to the addition of mailing address(es) to the dynamic mailing list.

An example of the embodiment described in Table D is shown in FIG. 5. Step 120, shown also in FIG. 3, includes step 500. In step 500, mailing address 9 with the "subscribed" and "active" status will be added to dynamic mailing list 14 (step 502), and mailing address 9 with the "subscribed" and "inactive" status (step 500) will not be added to dynamic mailing list 14 (step 504). Any mailing address 9 with the "not subscribed" status will be processed according to the add rule for possible addition to established mailing list 12 in step 115 of FIG. 3.

As explained above, hosting network 10 may host more than one mailing list. Each list has at least one subscribed mailing address or subscriber. In such a case, the status of each hosted mailing address may also reflect not only whether the address is included in established mailing list 12 but also whether the address is included in another list hosted on hosting network 10. For example as shown in Table E above, the status "not subscribed" also may be subdivided into the following two statuses: (1) known, wherein mailing address 9 is not included in established mailing list 12, but is included in at least one other hosted mailing list, and (2) new, wherein mailing address 9 is not included in established mailing list 12, and is not included in any other hosted mailing list.

In addition, the status of mailing address 9 may reflect historical subscriber information on hosting network 10. In one such embodiment as shown in Table F above, the status "not subscribed" further comprises the following three statuses: (1) unsubscribed or former, wherein mailing address 9 is not but was once included in established mailing list 12, (2) known, wherein mailing address 9 is not included in established mailing list 12, but is or was once included in at least one other hosted mailing list, and (3) new, wherein mailing address 9 is not and has not been included in established mailing list 12, and is not and has not been included in any other hosted mailing list.

The list join rule prescribes which processing action will be performed on mailing address 9 depending on its status. In an embodiment with three possible statuses, i.e., "unsubscribed", "known", and "new", and a choice of four processing actions, i.e., add without notice, welcome, invite, and drop, there are potentially sixty-four distinct list join rules. In an embodiment also with three possible statuses, i.e., "unsubscribed", "known", and "new", and a choice of three processing actions, i.e., welcome, invite, and drop, there are potentially twenty-seven distinct list join rules.

Several list join rule options are illustrated in Table J of FIG. 6. These include the following:

1. Add silently: All addresses with the status "not subscribed" are added without notice.
2. Welcome all: All addresses with the status "not subscribed" are welcomed.
3. Invite all: All addresses with the status "not subscribed" are invited.
4. Invite former subscribers and Welcome others: Any address with the status "known" or "new" is welcomed and any address with the status "unsubscribed" is invited to join the list.
5. Drop former subscribers and Welcome others: Any address with the status "known" or "new" is welcomed and any address with the status "unsubscribed" is dropped, i.e., processed with the drop action.
6. Welcome new addresses and Invite others: Any address with the status "new" is welcomed and any address with the status "unsubscribed" or "nknown" is invited to join the list.
7. Welcome new addresses and Drop others: Any address with the status "new" is welcomed and any address with the status "unsubscribed" or "known" is dropped.
8. Drop former subscribers and Invite others: Any address with the status "known" or "new" is invited to join the list and any address with the status "unsubscribed" is dropped.
9. Invite new addresses and Drop others: Any address with the status "new" is invited to join the list and any address with the status "unsubscribed" or "known" is dropped.
10. Subscriber initiation required: All addresses with the status "not subscribed" are dropped.

In one embodiment, the list join rule is set by the list host and may not be manipulated by list owner 2. In another embodiment, the list join rule is set by list owner 2 and may be manipulated by list owner 2. In another embodiment, the list join rule is initially set by the list host, but may be manipulated by list owner 2. In yet another embodiment in which a hierarchy of list join rules from most restrictive to least restrictive is determined, the list join rule is set by the list host and may be changed by list owner 2 only insofar as to make the list join rule more restrictive.

All of these list join options or a subset of these list join options may be available in alternative embodiments. The same list join rule may apply to not only established mailing list 12, but also to other lists hosted on hosting network 10.

Add Rule: Local Subscriber Preference

The add rule also may be a subscriber preference, which reflects the mailing address owner's wishes about being placed on a mailing list. According to the preferred embodiment, the subscriber preference is not manipulable by list owner 2. In addition, in the preferred embodiment, the subscriber preference will override a conflicting list join rule.

In one embodiment, the subscriber preference simply may be one of the following two options: (1) may add, wherein mailing address 9 may be added to a mailing list hosted on hosting network 10, and (2) may not add, wherein mailing address 9 may not be added to a mailing list hosted on hosting network 10.

In an alternative embodiment, the subscriber preference "may add" includes one of the following two options: (1) add without notice; and (2) notify.

The preference "add without notice" means that the mailing address owner permits his mailing address 9 to be added to a mailing list hosted on hosting network 10 without notification of the addition. The first indication he receives that his address has been added to a mailing list may be the first list message he receives. The corresponding processing action is to add mailing address 9 to established mailing list 12 without notice. The preference "notify" means that the mailing address owner permits his mailing address 9 to be added to a mailing list hosted on hosting network 10 as long as he receives notification of the addition. The corresponding processing action is the welcome action.

In another embodiment, the subscriber preference "may not add" includes one of the following two options: (1) invite; and (2) initiate.

The preference "invite" means that the mailing address owner permits his mailing address 9 to be added to a mailing list hosted on hosting network 10 only if he receives and responds to an invitation to join the list. The corresponding processing action is the invite action. The preference "initiate" means that the mailing address owner does not permit his mailing address 9 to be added to a mailing list hosted on hosting network 10 by anyone other than himself. In addition, the address owner does not want to be contacted regarding joining the list. The corresponding processing action is the drop action. Therefore, from least restrictive to most restrictive, the subscriber preference includes the following four options: (1) add without notice; (2) notify; (3) invite; and (4) initiate. Each preference has a corresponding processing action, and processing a mailing address according to the subscriber preference means that mailing address 9 will be processed with its corresponding processing action. In a preferred embodiment, the subscriber preference includes the following three options, from least restrictive to most restrictive: (1) notify; (2) invite; and (3) initiate.

In the preferred embodiment, the subscriber preference may be set initially to a default setting. Thereafter the address owner may change his subscriber preference through a subscriber interface as depicted in FIG. 1. For email lists, the subscriber preference may be set by web or by email in a manner known in the art. For example, a secure or password protected web interface can be made available for a subscriber to log into, then review and update his preference. Also in the preferred embodiment, list owner 2 does not have access to, and cannot change, a subscriber preference unless it is his own personal subscriber preference.

TABLE G

Subscriber Preferences

| | | Processing Action | | |
|---|---|---|---|---|
| | | Welcome Action least restrictive | Invite Action | Drop Action most restrictive |
| Subscriber Preference | Notify | YES | YES | YES |
| | Invite | NO | YES | YES |
| | Initiate | NO | NO | YES |

In a preferred embodiment as shown in Table G above, mailing address 9 is processed according to its corresponding processing action or alternatively may be processed with a more restrictive processing action. For example, if the subscriber preference for a mailing address 9 is "notify", mailing address 9 may be processed with either the welcome action, the invite action, or the drop action. If the subscriber preference for a mailing address 9 is "invite", mailing address 9 may be processed with either the invite action or the drop action, but may not be processed with the welcome action. If the subscriber preference is "initiate", mailing address 9 may be processed only with the drop action since there is no other processing action that is more restrictive.

Figure 7:
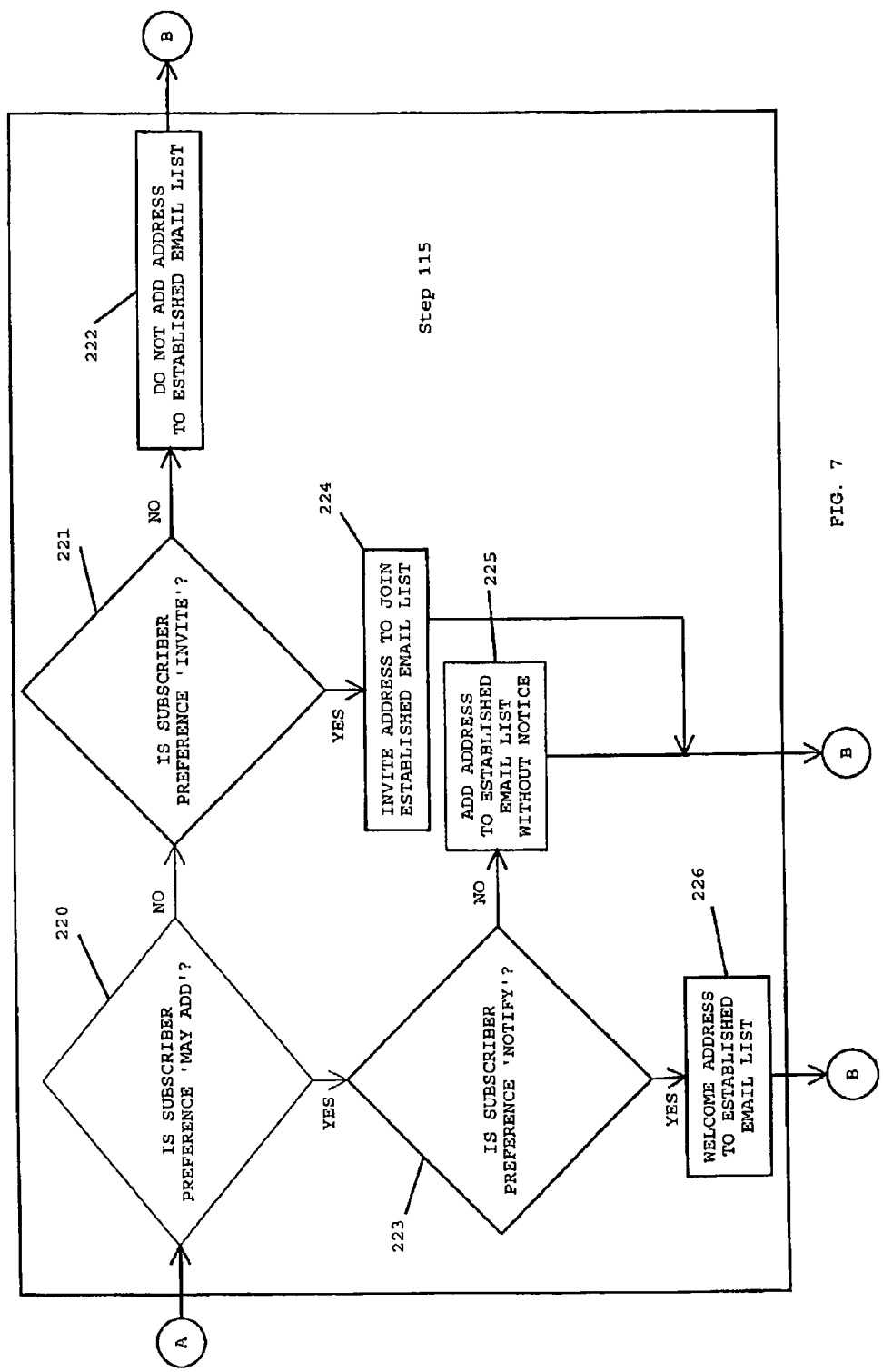
FIG. 7 shows an exemplary embodiment of step 115 of the method shown in FIG. 3, wherein the add rule is a subscriber preference.

FIG. 7 shows an exemplary embodiment of step 115 of FIG. 3, wherein the add rule is a subscriber preference. In step 220 of FIG. 7, it is determined whether the subscriber preference is "may add". If it is not, then it is determined whether the subscriber preference is "invite" (step 221). If the subscriber preference is not "invite" (step 221), mailing address 9 is not added to established mailing list 12 (step 222). If the subscriber preference is "invite" (step 221), mailing address 9 is invited to join established mailing list 12 (step 224). If, on the other hand, the subscriber preference is "may add" (step 220), then it is determined whether the subscriber preference is "notify" (step 223). If the subscriber preference is "notify" (step 223), mailing address 9 is welcomed to established mailing list 12 (step 226). If the subscriber preference is not "notify" (step 223), mailing address 9 is added to established mailing list 12 without notice (step 225).

Those skilled in the art will know that the algorithm shown in FIG. 7 may be rearranged without materially changing the process. The process may begin by checking whether the subscriber preference is "invite" first, and if not, checking whether the subscriber preference is "notify", rather than following the sequence shown in FIG. 7.

Figure 8:
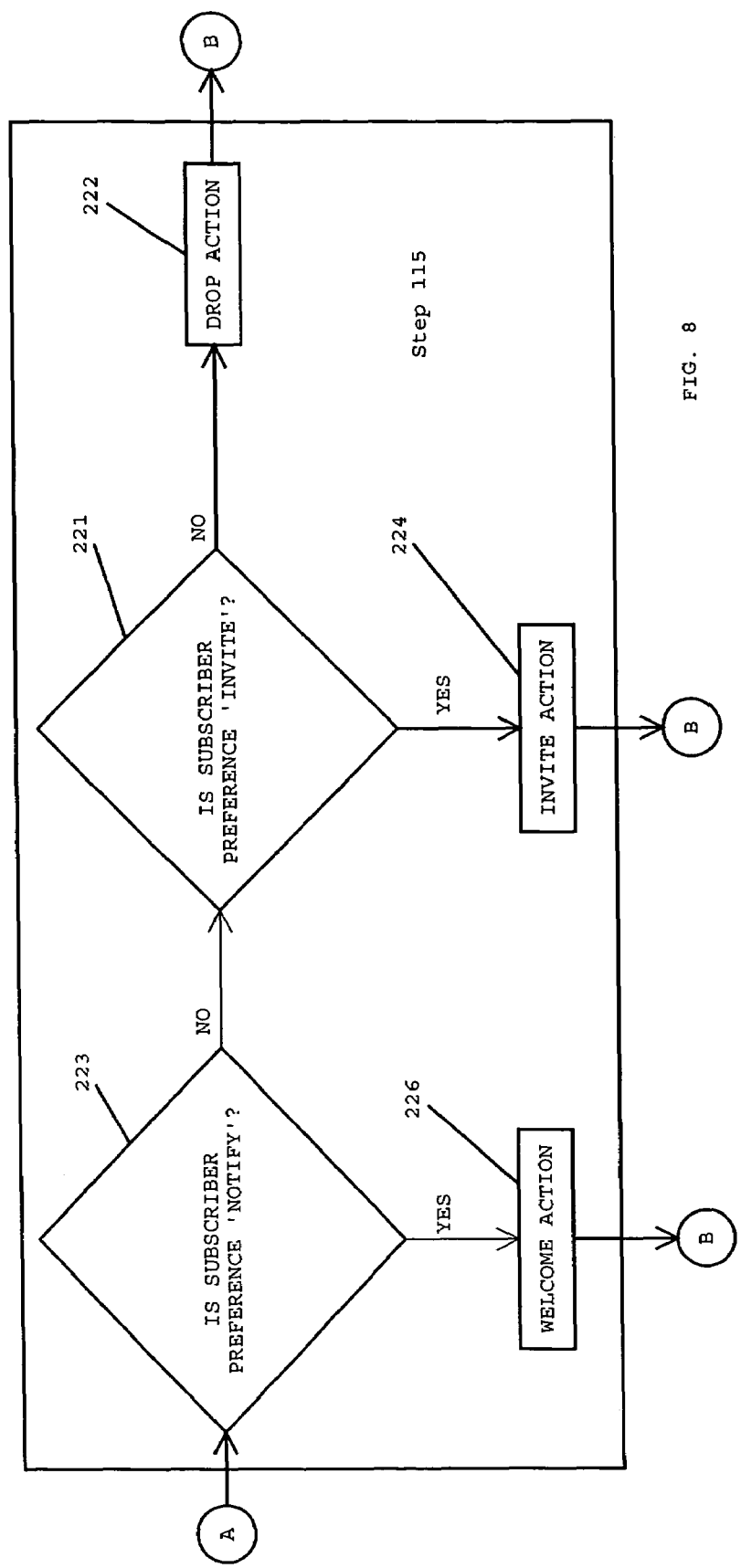
FIG. 8 shows another exemplary embodiment of step 115 of the method shown in FIG. 3, wherein the add rule is a subscriber preference.

FIG. 8 shows another exemplary embodiment of step 115 of FIG. 3 according to the present invention, wherein the add rule is a subscriber preference. In step 223 of FIG. 8, if the subscriber preference is "notify", mailing address 9 from source list 11 is processed with the welcome action (step 226). If the subscriber preference is not "notify" (step 223) but is "invite" (step 221), mailing address 9 is processed with the invite action (step 224). If the subscriber preference is not "notify" (step 223) and is not "invite" (step 221), mailing address 9 is processed with the drop action (step 222).

Figure 9:
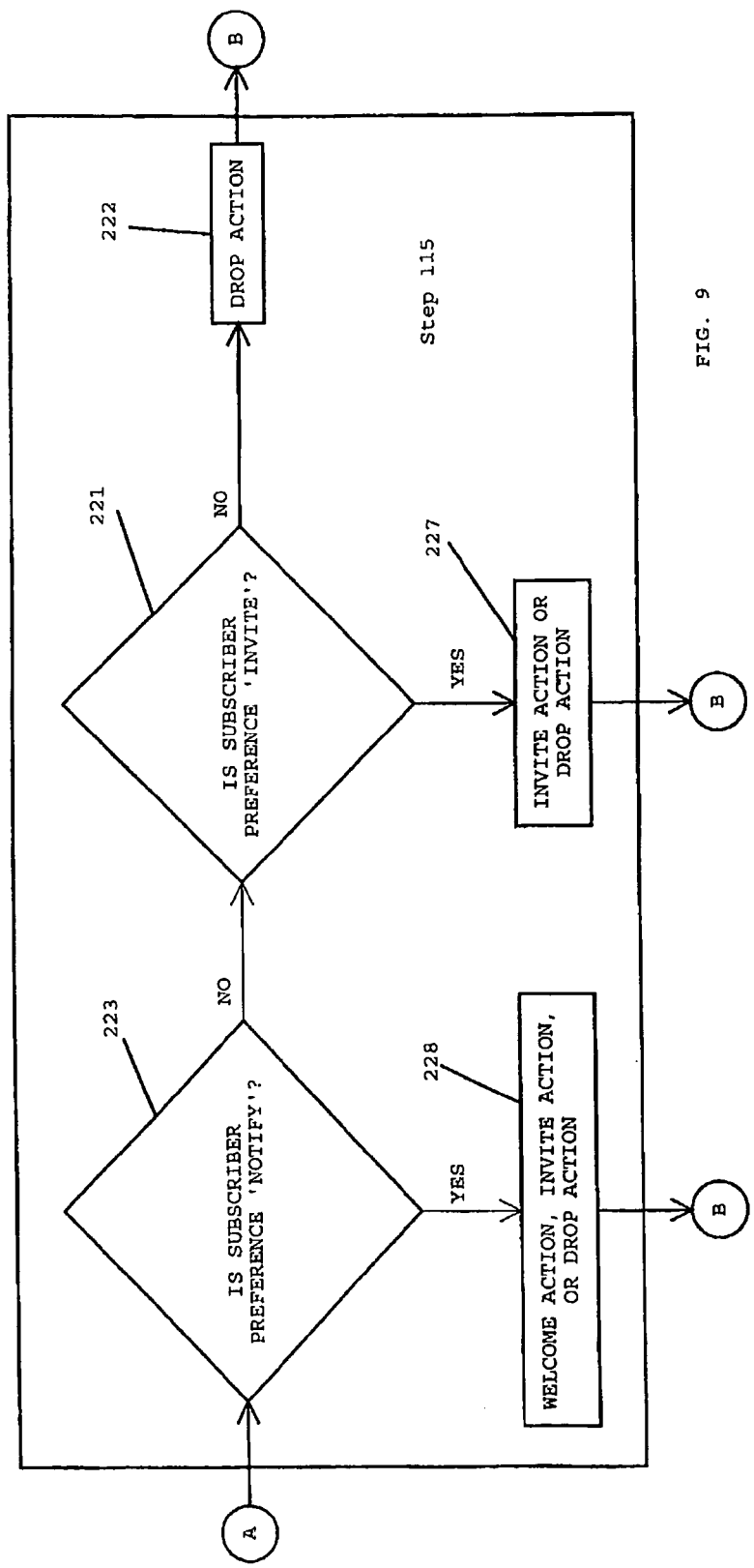
FIG. 9 shows yet another exemplary embodiment of step 115 of the method shown in FIG. 3, wherein the add rule is a subscriber preference.

FIG. 9 shows yet another exemplary embodiment of step 115 of FIG. 3 according to the present invention, wherein the add rule is a subscriber preference. This figure illustrates the processing actions shown in Table G above. In step 223 of FIG. 9, if the subscriber preference is "notify", mailing address 9 is processed with the welcome action, invite action, or drop action (step 228). If the subscriber preference is not "notify" (step 223) but is "invite" (step 221), mailing address 9 is processed with the invite action or the drop action (step 227). If the subscriber preference is not "notify" (step 223) and is not "invite" (step 221), mailing address 9 is processed with the drop action (step 222).

Add Rule: Global Subscriber Preference

As stated before, hosting network 10 may host more than one mailing list, which in turn has at least one subscribed mailing address or subscriber. In such a case, different subscriber preferences may be stored reflecting an addressee's mailing list preference with regard to any hosted mailing list.

In one embodiment, there is a global subscriber preference, which determines whether mailing address 9 may be added to any hosted mailing list.

In another embodiment, there is a local subscriber preference, which determines whether a mailing address may be added to a subset of all hosted mailing lists. In the preferred embodiment, this subset includes all hosted mailing lists owned by a single list owner, i.e., local list(s). These lists may share the same domain name in their list addresses or may have different domain names.

In yet another embodiment, there is both a global subscriber preference and a local subscriber preference. In case the global and local preferences of one mailing address conflict, the conflict may be resolved in alternative ways. First, the global preference may override the local preference in all cases. Second, the local preference may override the global preference. Third, the global subscriber preference may override the local subscriber preference if and only if the global subscriber preference is more restrictive than the local subscriber preference. Otherwise, the local subscriber preference determines what action is taken.

TABLE H

Global and Local Subscriber Preferences

|  |  | Global Subscriber Preference | |
|---|---|---|---|
|  |  | May Add | May Not Add |
| Local Subscriber Preference | May Add | Add | Do Not Add |
|  | May Not Add | Do Not Add | Do Not Add |

For example, the embodiment shown in Table H above includes both a global subscriber preference and a local subscriber preference, wherein either may be one of the following two options: (1) may add, wherein mailing address 9 may be added to a mailing list hosted on hosting network 10, and (2) may not add, wherein mailing address 9 may not be added to a mailing list hosted on hosting network 10. In this example, when both preferences are "may add", address may be added to established mailing list 12. Otherwise, address may not be added to established mailing list 12.

In another embodiment, both the global and local subscriber preferences may include two or more of the same choices, from least restrictive to most restrictive: (1) add without notice; (2) notify; (3) invite; and (4) initiate.

TABLE I

More Restrictive Preference Overrides in Case of Conflict

|  |  | Global Subscriber Preference | | |
|---|---|---|---|---|
|  |  | Notify | Invite | Initiate |
| Local Subscriber Preference | Notify | Welcome Action | Invite Action | Drop Action |
|  | Invite | Invite Action | Invite Action | Drop Action |
|  | Initiate | Drop Action | Drop Action | Drop Action |

In a preferred embodiment shown in Table I above, both the global and local subscriber preference includes the following options, from least restrictive to most restrictive: (1) notify; (2) invite; and (3) initiate. If both preferences are "notify", the welcome action is taken. If both preferences are "invite", the invite action is taken. If both preferences are "initiate", the drop action is taken. In cases of conflict, the more restrictive subscriber preference determines which action is taken. For example, if the local preference is "notify", and the global preference is "initiate", which is more restrictive than "notify", the drop action is taken since in this case the global preference overrides the local preference.

Multiple Add Rules

There may be a conflict between the add rules as applied to mailing address 9. In the preferred embodiment, the address rule overrides other add rules. In other words, despite the status of a mailing address 9, the list join rule, or the subscriber preference for the mailing address 9, it will not be added to established mailing list 12 if it matches an address rule.

Figure 10:
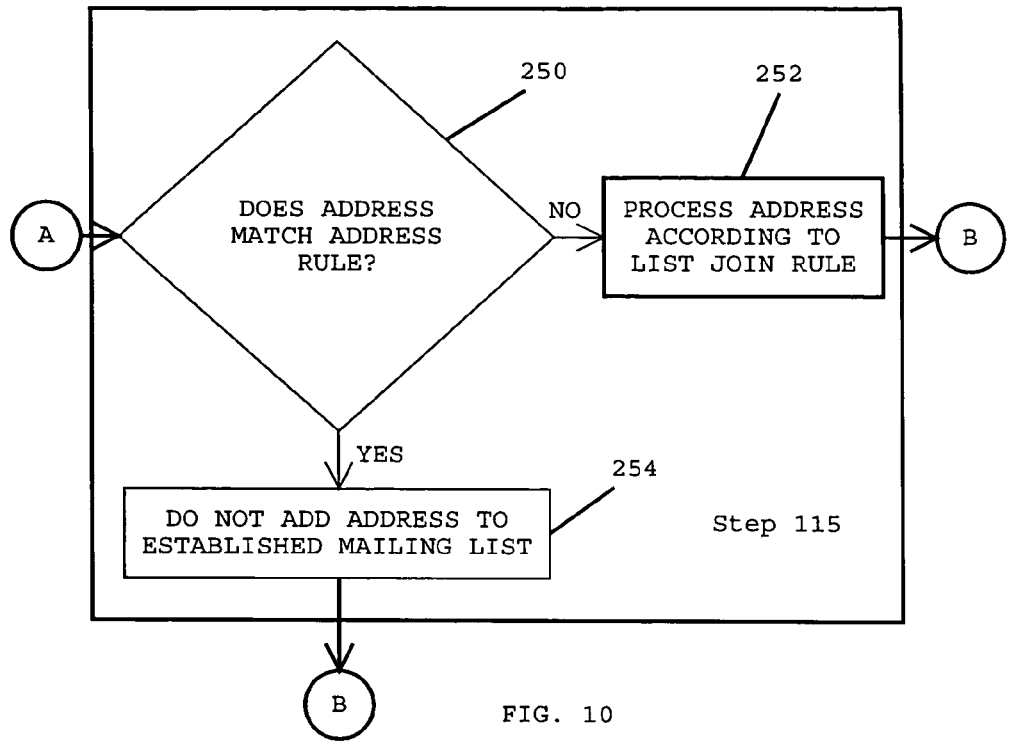
FIG. 10 shows an exemplary embodiment of step 115 of the method shown in FIG. 3, wherein the add rule is an address rule and a list join rule.

For example, as shown in FIG. 10, which depicts step 115 in FIG. 3, the add rule may comprise an address rule and a list join rule. In step 250 of FIG. 10, if the address matches the address rule, the address is not added to established mailing list 12 (step 254). Only if mailing address 9 does not match the address rule will mailing address 9 be processed according to the list join rule (step 252).

Figure 11:
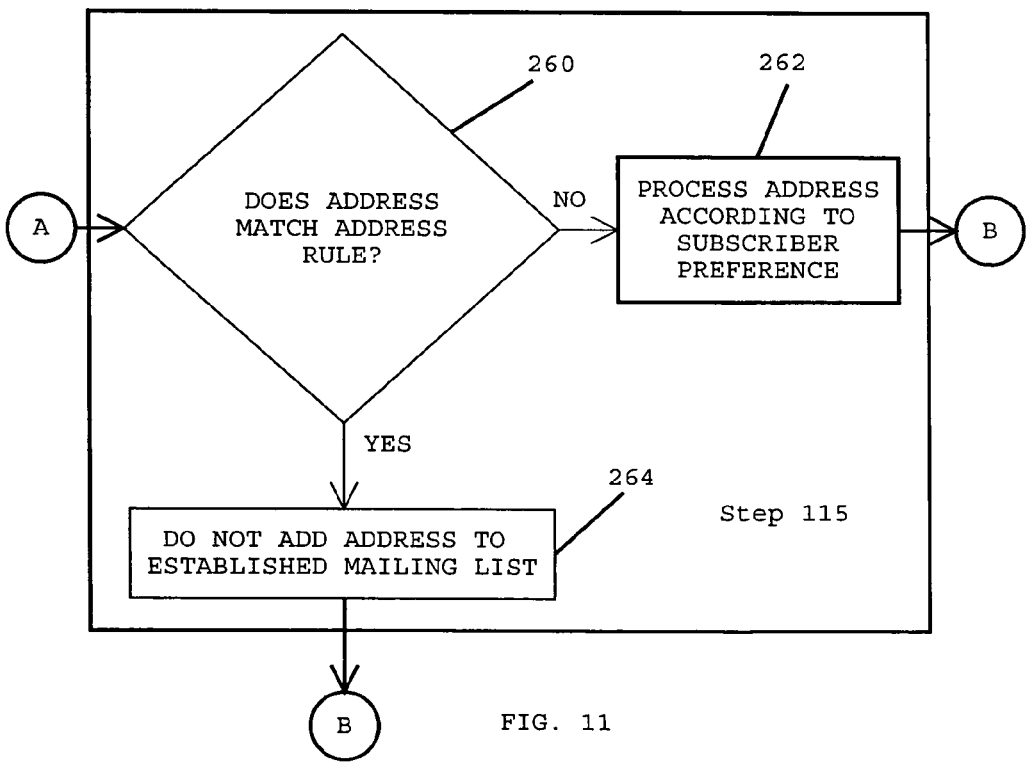
FIG. 11 shows an exemplary embodiment of step 115 of the method shown in FIG. 3, wherein the add rule is an address rule and a subscriber preference.

As another example, as shown in FIG. 11, which also depicts step 115 in FIG. 3, the add rule may comprise an address rule and a subscriber preference. In step 260 of FIG. 11, if mailing address 9 matches the address rule, mailing address 9 is not added to established mailing list 12 (step 264). Only if mailing address 9 does not match the address rule will mailing address 9 be processed according to the subscriber preference (step 262).

In addition, there may be a conflict between the list join rule and the subscriber preference for a given address. There are various ways to resolve such a conflict. The process can be configured such that the list join rule always overrides a conflicting subscriber preference. In other words, the list join rule will be followed even if it conflicts with the subscriber preference. Alternatively, to protect the wishes of the subscribers, the subscriber preference overrides a conflicting list join rule.

Figure 12:
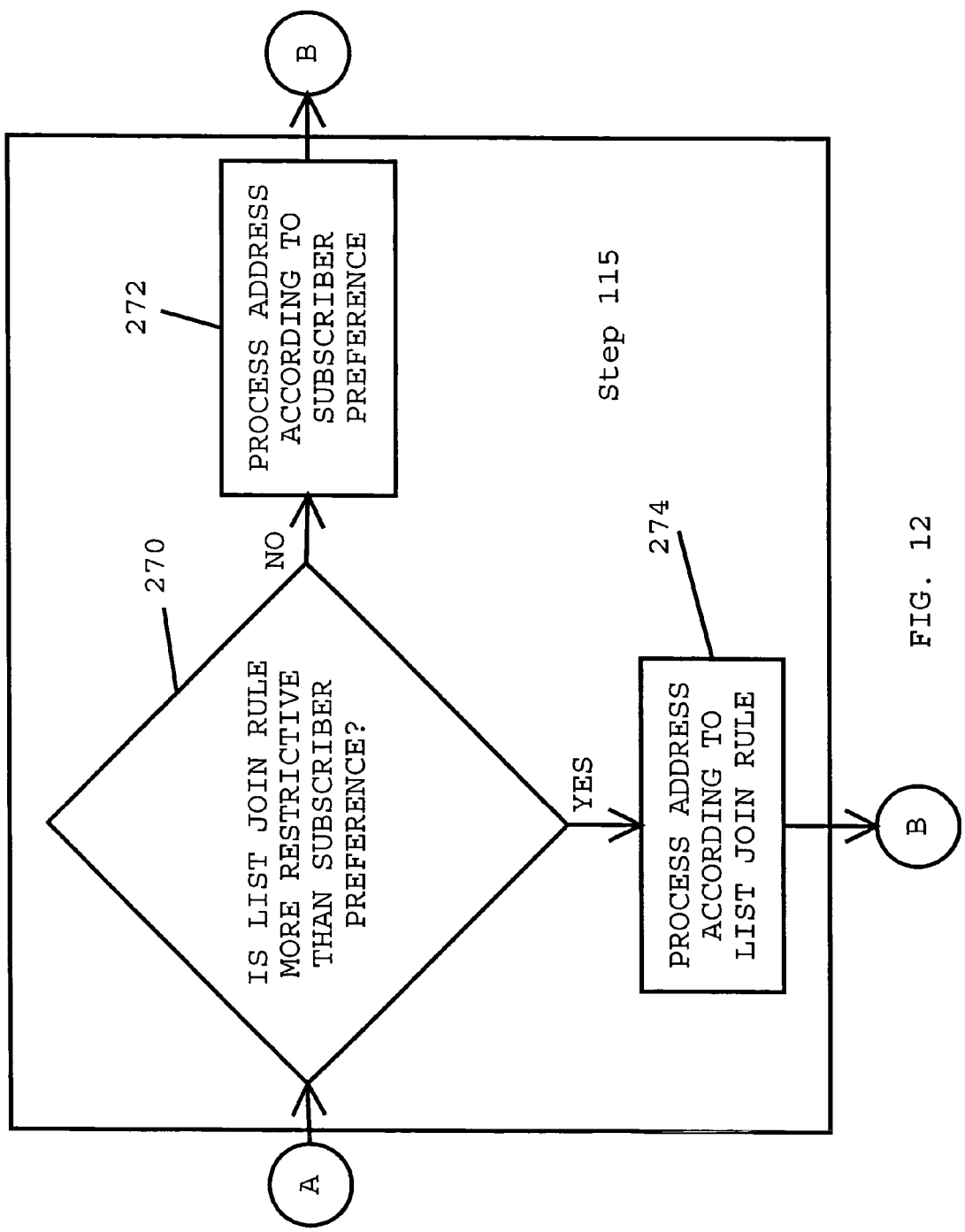
FIG. 12 shows an exemplary embodiment of step 115 of the method shown in FIG. 3, wherein the add rule is a list join rule and a subscriber preference and wherein the most restrictive rule or preference is followed.
Figure 13:
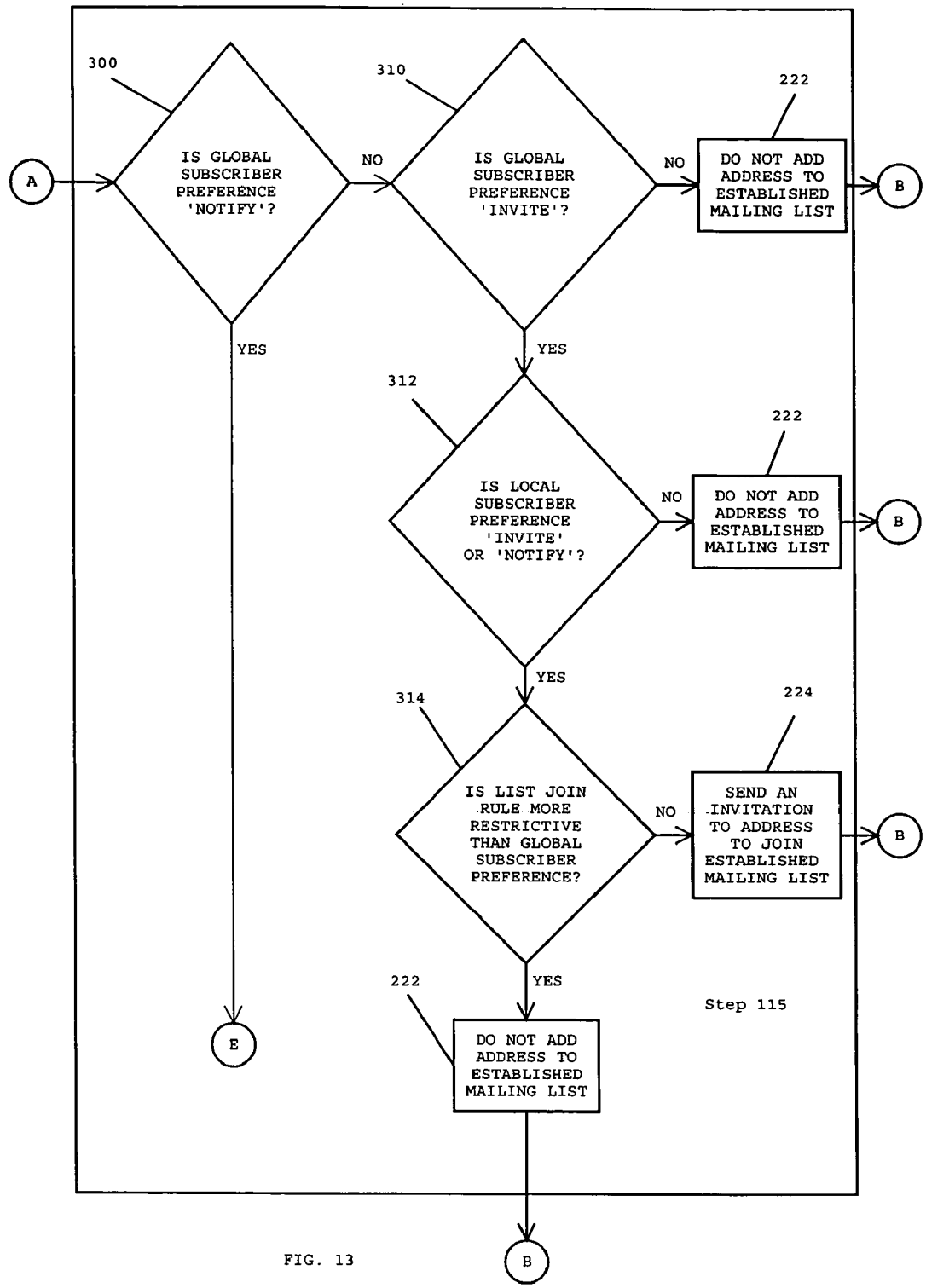
FIG. 13 shows an exemplary embodiment of step 115 of the method shown in FIG. 3, wherein the add rule is a list join rule, a global subscriber preference and a local subscriber preference, wherein the most restrictive rule or preference is followed.
Figure 13:
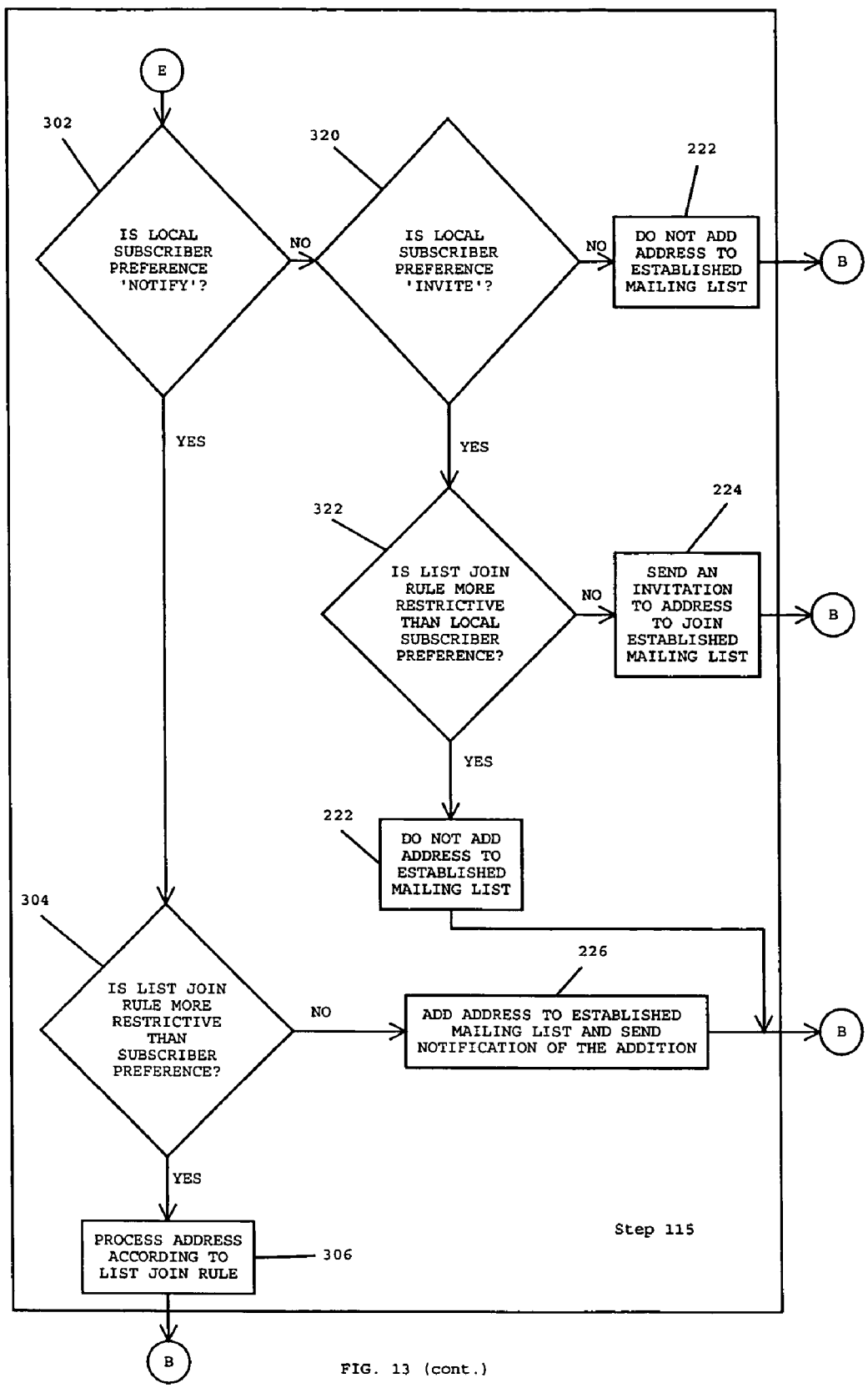

FIGS. 12 and 13 show a preferred embodiment of step 115 of FIG. 3, wherein the list join rule overrides subscriber preference only when the list join rule is more restrictive than the subscriber preference. Otherwise, the subscriber preference is followed. A simplified algorithm of this embodiment is shown in FIG. 12, whereas a more detailed version is shown in FIG. 13.

As shown in step 270 of FIG. 12, if the list join rule is more restrictive than the subscriber preference, then mailing address 9 is processed according to the list join rule (step 274). If the list join rule is not more restrictive than the subscriber preference (step 270), mailing address 9 is processed according to the subscriber preference (step 272). In this embodiment, "subscriber preference" may mean a local subscriber preference, a global subscriber preference, or in case there are both, whichever of the two preferences overrides the other.

In an illustrative example using FIG. 13, the list join rule is set so that mailing address 9 from source list 11 with the status "known" is processed with the welcome action and one address with the "known" status has a registered global and local subscriber preference of "invite". In step 300 in FIG. 13, the global subscriber preference is not "notify". In step 310, the global subscriber preference is "invite" (step 310), and the local subscriber preference is "invite" (step 312). The list join rule is not more restrictive than the global subscriber preference (step 314). Therefore, mailing address 9 is processed with the invite action according to the subscriber preference (step 224).

Other scenarios are also possible. In FIG. 13, if the global subscriber preference is not "notify" (step 300) and not "invite" (step 310), then mailing address 9 is not added to established mailing list 12 (step 222). If the global subscriber preference is "invite" (step 310), and the local subscriber preference is neither "invite" nor "notify" (step 312), then mailing address 9 is not added to established mailing list 12 (step 222). If the global subscriber preference is "invite" (step 310), the local subscriber preference is "notify" or "invite" (step 312), and the list join rule is more restrictive than the global subscriber preference (step 314), then mailing address 9 is not added to established mailing list 12 (step 222).

In another example, the list join rule is set so that mailing address 9 from source list 11 with the status "known" is processed with the invite action and one address with the "known" status has a registered subscriber preference of "notify". In step 300 of FIG. 13, the global subscriber preference is "notify" and the local subscriber preference is "notify" (step 302). The list join rule is more restrictive than the global subscriber preference (step 304). Therefore, the address is processed with the invite action according to the list join rule (step 306).

Other scenarios are also possible. In FIG. 13, if the global subscriber preference is "notify" (step 300), the local subscriber preference is "notify" (step 302), and the list join rule is not more restrictive than the subscriber preference (step 304), then mailing address 9 is added to established mailing list 12 and sent a notification of the addition (step 226). If the global subscriber preference is "notify" (step 300), the local subscriber preference is not "notify" (step 302), the local subscriber preference is "invite" (step 320), and the list join rule is more restrictive than the subscriber preference (step 322), then mailing address 9 is not added to established mailing list 12 (step 222). If the global subscriber preference is "notify" (step 300), the local subscriber preference is not "notify" (step 302), the local subscriber preference is "invite" (step 320), and the list join rule is not more restrictive than the subscriber preference (step 322), then mailing address 9 is sent an invitation to join established mailing list 12 (step 224). Finally, if the global subscriber preference is "notify" (step 300), the local subscriber preference is not "notify" (step 302) and not "invite" (step 320), then mailing address 9 is not added to established mailing list 12 (step 222).

In an alternative embodiment as shown in FIG. 14, which also depicts step 115 in FIG. 3, the add rule comprises an address rule, a list join rule, and a subscriber preference. If mailing address 9 matches the address rule (step 400), then mailing address 9 is not added to established mailing list 12 (step 404). If the mailing address 9 does not match the address rule (step 400), and the list join rule is more restrictive than the subscriber preference (step 402), then mailing address 9 is processed according to the list join rule (step 406). On the other hand, if mailing address 9 does not match the address rule (step 400), and the list join rule is not more restrictive than the subscriber preference (step 402), then mailing address 9 is processed according to the subscriber preference (step 408).

Dynamic Mailing List

The present process allows list owner 2 to build or grow established mailing list 12 that meets the requirements imposed by the add rule. Because the requirements of all parties involved in list hosting and delivery, i.e., list owners, list subscribers, and intermediate recipients such as ISPs, may be reflected in the add rule, each of the addresses added to established mailing list 12 is effectively approved by these parties. The resultant dynamic mailing list 14 is then made up of only those mailing addresses 9 that are included in established mailing list 12. The present method therefore provides a way to effectively mediate the needs of the parties involved.

For an email list owner who maintains a database of subscriber information, which may include sensitive information such as social security numbers or credit card numbers, the present process also allows the list owner to maintain privacy and control over this database since only a list of email addresses need be uploaded, i.e., source list 11, rather than the list owner's entire database. In other words, this process allows a list owner to keep his database separate from email list functions.

It is contemplated that list owner 2 will send a list message to dynamic mailing list 14. In this case, hosting network 10 may handle delivery of this message. However, other uses may be made of dynamic mailing list 14. For example, dynamic mailing list 14 may be transferred to another computer or network that can handle message delivery. Alternatively the list owner may download dynamic mailing list 14 from hosting network 10 for any other use.

What is claimed:

1. A method for building an established mailing list from a source mailing list by adding a mailing address from the source mailing list to the established mailing list, comprising the steps of:
    comparing the source mailing list to the established mailing list, the source mailing list including the mailing address to which a sender desires to send a message;
    when the mailing address is included in the established mailing list, making a preliminary determination to add the mailing address to a dynamic mailing list; and
    when the mailing address is not included in the established mailing list, adding the mailing address to the established mailing list according to a procedure defined by an add rule, the add rule including at least one of: (a) an address rule, (b) a list join rule, and (c) a subscriber preference, wherein if the add rule includes the subscriber preference, the subscriber preference includes at least one of: (a) a global subscriber preference including restrictions on adding mailing addresses to any of a plurality of hosted mailing lists and wherein the established mailing list is one of the plurality of hosted mailing lists; and (b) a local subscriber preference which includes restrictions on adding mailing addresses to a subset of the plurality of hosted mailing lists and wherein the established mailing list is one of the subset of the plurality of hosted mailing lists.

2. The method according to claim 1, wherein the mailing address is an email address.

3. The method according to claim 1, wherein the add rule includes the address rule, wherein the mailing address includes a plurality of characters, wherein the address rule includes a string of at least one character, and wherein the mailing address is not added to the established mailing list when the string is included in the mailing address.

4. The method according to claim 1, wherein the add rule includes the address rule, wherein the mailing address corresponds to a first set of data, wherein the address rule includes a second set of data, and wherein the mailing address is not added to the established mailing list when the first set of data includes the second set of data.

5. The method according to claim 1, wherein the add rule includes the address rule, and wherein the address rule includes at least one of: (a) a network hosting rule which cannot be manipulated by the sender; and (b) a list owner rule which can be manipulated by the sender.

6. The method according to claim 1, wherein the mailing address has a status, which is one of:
    a. "active", wherein the mailing address is included in the established mailing list and is receiving messages; and
    b. "inactive", wherein the mailing address is included in the established mailing list and is not receiving messages.

7. The method according to claim 6, further comprising the step of making a final determination not to add the mailing address to the dynamic mailing list if the status is "inactive".

8. The method according to claim 1, wherein the preliminary determination is a final determination.

9. The method according to claim 1, wherein the procedure defined by the add rule includes one of the following steps:
    a. adding the mailing address to the established mailing list; and
    b. not adding the mailing address to the established mailing list.

10. The method according to claim 9, wherein the step of adding the mailing address to the established mailing list also includes sending a notification to the mailing address that the mailing address has been added to the established mailing list.

11. The method according to claim 9, wherein the step of not adding the mailing address to the established mailing list also includes sending an invitation to the mailing address to join the established mailing list.

12. The method according to claim 1, including one of:
    a. a "drop action", wherein the mailing address is not added to the established mailing list;
    b. an "invite action", wherein an invitation is sent to the mailing address to join the established mailing list; and
    c. a "welcome action", wherein the mailing address is added to the established mailing list and is sent a notification that the mailing address has been added to the established mailing list.

13. The method according to claim 12, wherein the mailing address has a status which is one of:
    a. "subscribed", wherein the mailing address is included in the established mailing list; and
    b. "not subscribed", wherein the mailing address is not included in the established mailing list.

14. A method for building an established mailing list from a source mailing list by adding a mailing address from the source mailing list to the established mailing list, comprising the steps of:
    comparing the source mailing list to the established mailing list, the source mailing list including the mailing address to which a sender desires to send a message;
    when the mailing address is included in the established mailing list, making a preliminary determination to add the mailing address to a dynamic mailing list; and
    when the mailing address is not included in the established mailing list, adding the mailing address to the established mailing list according to a procedure defined by an add rule, which includes one of: (a) a "drop action", wherein the mailing address is not added to the established mailing list. (b) an "invite action", wherein an invitation is sent to the mailing address to join the established mailing list, and (c) a "welcome action", wherein the mailing address is added to the established mailing list and is sent a notification that the mailing address has been added to the established mailing list.
    wherein the mailing address has a status which is one of: (a) "subscribed", wherein the mailing address is included in the established mailing list, and (b) "not subscribed", wherein the mailing address is not included in the established mailing list, and
    wherein the "not subscribed" status includes one of the following statuses:

a. "unsubscribed", wherein the mailing address currently is not included in the established mailing list, and previously has been included in the established mailing list;

b. "known", wherein the mailing address is not included in the established mailing list and wherein one of:
  i. the mailing address is included in at least one of a plurality of hosted mailing lists, and
  ii. the mailing address has been included in at least one of the plurality of hosted mailing lists; and c. "new", wherein the mailing address is not and has not been included in the established mailing list, and is not and has not been included in any of the plurality of hosted mailing lists.

15. The method according to claim 14, wherein the add rule includes a list join rule and wherein the list join rule determines whether the mailing address is to be added to the established mailing list as a function of the status.

16. The method according to claim 15, wherein the list join rule is one of the following:

a. "welcome all", wherein the processing step is the welcome action if the status of the mailing address is not subscribed;

b. "invite all", wherein the processing step is the invite action if the status of the mailing address is not subscribed;

c. "invite former subscribers and welcome others", wherein the processing step includes:
  i. the welcome action if the status of the mailing address is one of known and new, and
  ii. the invite action if the status of the mailing address is unsubscribed;

d. "drop former subscribers and welcome others", wherein the processing step includes:
  i. the welcome action if the status of the mailing address is one of known and new, and
  ii. the drop action if the status of the mailing address is unsubscribed;

e. "welcome new addresses and invite others", wherein the processing step includes:
  i. the welcome action if the status of the mailing address is new, and
  ii. the invite action if the status of the mailing address is one of unsubscribed and known;

f. "welcome new addresses and drop others", wherein the processing step includes:
  i. the welcome action if the status of the mailing address is new, and
  ii. the drop action if the status of the mailing address is one of unsubscribed and known;

g. "drop former subscribers and invite others", wherein the processing step includes:
  i. the invite action if the status of the mailing address is one of known and new, and
  ii. the drop action if the status of the mailing address is unsubscribed;

h. "invite new addresses and drop others", wherein the processing step includes:
  i. the invite action if the status of the mailing address is new, and
  ii. the drop action if the status of the mailing address is one of unsubscribed and known; and i. "subscriber initiation required", wherein the processing step is the drop action if the status of the mailing address is not subscribed.

17. The method according to claim 1, wherein the add rule includes the subscriber preference, and wherein the subscriber preference is not manipulable by the sender and includes restrictions on adding the mailing address to the established mailing list.

18. The method according to claim 17, wherein the subscriber preference is one of:
  a. "may add", wherein the mailing address may be added to the established mailing list; and
  b. "may not add", wherein the mailing address may not be added to the established mailing list.

19. The method according to claim 18, wherein the subscriber preference "may add" includes one of the following preferences:
  a. "notify", wherein the mailing address may be added to the established mailing list as long as a notification is sent to the mailing address that the mailing address has been added to the established mailing list; and
  b. "add without notice", wherein the mailing address may be added to the established mailing list without a notification.

20. The method according to claim 18, wherein the subscriber preference "may not add" includes one of the following preferences:
  a. "invite", wherein the mailing address may not be added to the established mailing list, and may be sent an invitation to join the established mailing list, and
  b. "initiate", wherein the mailing address may not be added to the established mailing list, and may not be sent an invitation to join the established mailing list.

21. The method according to claim 17, wherein the subscriber preference is one of:
  a. "notify", wherein the mailing address may be added to the mailing address as long as a notification is sent to the mailing address that the mailing address has been added to the established mailing list;
  b. "invite", wherein the mailing address may not be added to established mailing list, and may be sent an invitation to join the established mailing list; and
  c. "initiate", wherein the mailing address may not be added to the established mailing list and may not be sent an invitation to join the established mailing list.

22. The method according to claim 21, including one of:
  a. a "drop action" in case the subscriber preference is "initiate", wherein the drop action includes not adding the mailing address to the established mailing list;
  b. a "drop or invite action" comprising one of the drop action and an "invite action" in case the subscriber preference is "invite", wherein the invite action includes sending an invitation to the mailing address to join the established mailing list; and
  c. a "drop, invite, or welcome action" comprising one of the drop action, the invite action, and a "welcome action" in case the subscriber preference is "notify", wherein the welcome action includes adding the mailing address to the established mailing list and sending a notification to the mailing address that the mailing address has been added to the established mailing list.

23. The method according to claim 17, wherein the subscriber preference includes at least one of: (a) a global subscriber preference which includes restrictions on adding the mailing address to any of a plurality of hosted mailing lists and wherein the established mailing list is one of the plurality of hosted mailing lists; and (b) a local subscriber preference which includes restrictions on adding the mailing address to a subset of the plurality of hosted mailing lists and wherein the established mailing list is one of the subset of the plurality of hosted mailing lists.

24. The method according to claim 23, wherein the subscriber preference includes the alobal subscriber preference and the local subscriber preference, and wherein the global subscriber preference overrides the local subscriber preference in case of a conflict between the global subscriber preference and the local subscriber preference.

25. The method according to claim 23, wherein the subscriber preference includes the global subscriber preference and the local subscriber preference, and wherein the local subscriber preference overrides the global subscriber preference in case of a conflict between the global subscriber preference and the local subscriber preference.

26. The method according to claim 23, wherein the subscriber preference includes the global subscriber preference and the local subscriber preference, and wherein each of the global subscriber preference and the local subscriber preference is one of:
   a. "notify", wherein the mailing address may be added to the established mailing list as long as the mailing address is sent a notification that the mailing address has been added to the established mailing list;
   b. "invite", wherein the mailing address may not be added to the established mailing list, and may be sent an invitation to join the established mailing list; and
   c. "initiate", wherein the mailing address may not be added to the established mailing list, and may not be sent an invitation to join the established mailing list.

27. The method according to claim 26, wherein the subscriber preference "initiate" is more restrictive than the subscriber preference "invite", and the subscriber preference "invite" is more restrictive than the subscriber preference "notify".

28. The method according to claim 27, wherein the global subscriber preference overrides the local subscriber preference in case the global subscriber preference is more restrictive than the local subscriber preference.

29. The method according to claim 1, wherein the add rule includes the address rule and at least one of the list join rule and the subscriber preference, wherein the address rule overrides the at least one of the list join rule and the subscriber preference.

30. The method according to claim 1, wherein the add rule includes the list join rule and the subscriber preference, and wherein the subscriber preference overrides the list join rule in case of a conflict between the subscriber preference and the list join rule.

31. The method according to claim 12,
   wherein the add rule includes a list join rule and a subscriber preference,
   wherein the drop action is more restrictive than the invite action, and the invite action is more restrictive than the welcome action,
   wherein the list join rule overrides the subscriber preference in case the list join rule requires a more restrictive step than the subscriber preference, and
   wherein the subscriber preference overrides the list join rule in case the subscriber preference requires a more restrictive step than the list join rule.

32. The method according to claim 30, wherein the subscriber preference includes a global subscriber preference and a local subscriber preference, wherein the global subscriber preference overrides the local subscriber preference in case of a conflict between the global subscriber preference and the local subscriber preference.

33. The method according to claim 30, wherein the subscriber preference includes a global subscriber preference and a local subscriber preference, wherein the local subscriber preference overrides the global subscriber preference in case of a conflict between the global subscriber preference and the local subscriber preference.

34. A method for generating a dynamic mailing list, comprising the steps of:
   a. comparing a source mailing list to an established mailing list,
   wherein the established mailing list is one of a plurality of hosted mailing lists, the source mailing list includes a mailing address to which a sender desires to send a message, and the mailing address has a status, wherein the status is one of:
      i. "active", wherein the mailing address is included in the established mailing list and is receiving messages,
      ii. "inactive", wherein the mailing address is included in the established mailing list and is not receiving messages,
      iii. "unsubscribed", wherein the mailing address currently is not and previously has been included in the established mailing list,
      iv. "known", wherein the mailing address is not included in the established mailing list and one of:
         (a) the mailing address is included in at least one other hosted mailing list and
         (b) the mailing address has been included in at least one other hosted mailing list, and
      v. "new", wherein the mailing address is not and has not been included in the established mailing list and is not and has not been included in any other hosted mailing list;
   b. when the mailing address is included in the established mailing list and the status is active, adding the mailing address to the dynamic mailing list;
   c. when the mailing address is included in the established mailing list and the status is inactive, not adding the mailing address to the dynamic mailing list; and
   d. when the mailing address is not included in the established mailing list; processing the mailing address according to a procedure defined by a list join rule with one of the following actions:
      i. a "drop action", wherein the mailing address is not added to the established mailing list,
      ii. an "invite action", wherein an invitation is sent to the mailing address to join the established mailing list, and
      iii. a "welcome action", wherein the mailing address is added to the established mailing list and a notification is sent to the mailing address that the mailing address has been added to the established mailing list,
   wherein the list join rule is one of:
      a. "welcome all", wherein the processing step is the welcome action if the status of the mailing address is one of unsubscribed, known, and new;
      b. "invite all", wherein the processing step is the invite action if the status of the mailing address is one of unsubscribed, known, and new;
      c. "invite former subscribers and welcome others", wherein the processing step comprises:
         i. the welcome action if the status of the mailing address is one of known and new, and
         ii. the invite action if the status of the mailing address is unsubscribed;
      d. "drop former subscribers and welcome others", wherein the processing step comprises:

i. the welcome action if the status of the mailing address is one of known and new, and
ii. the drop action if the status of the mailing address is unsubscribed;
e. "welcome new addresses and invite others", wherein the processing step comprises:
i. the welcome action if the status of the mailing address is new, and
ii. the invite action if the status of the mailing address is one of unsubscribed and known;
f. "welcome new addresses and drop others", wherein the processing step comprises:
i. the welcome action if the status of the mailing address is new, and
ii. the drop action if the status of the mailing address is one of unsubscribed and known;
g. "drop former subscribers and invite others", wherein the processing step comprises:
i. the invite action if the status of the mailing address is one of known and new, and
ii. the drop action if the status of the mailing address is unsubscribed;
h. "invite new addresses and drop others", wherein the processing step comprises:
i. the invite action if the status of the mailing address is new, and
ii. the drop action if the status of the mailing address is one of unsubscribed and known; and
i. "subscriber initiation required", wherein the processing step is the drop action if the status of the mailing address is one of unsubscribed, known, and new.

35. A method for processing a source mailing list, comprising the steps of:
comparing the source mailing list to an established mailing list, the source mailing list including a mailing address to which a sender desires to send a message;
when the mailing address is included in the established mailing list, making a preliminary determination to add the mailing address to a dynamic mailing list; and
when the mailing address is not included in the established mailing list, processing the mailing address according to a procedure defined by a subscriber preference,
wherein the subscriber preference is not manipulable by the sender and includes at least one of: (a) a global subscriber preference including restrictions on adding mailing addresses to any of a plurality of hosted mailing lists and wherein the established mailing list is one of the plurality of hosted mailing lists; and (b) a local subscriber preference which includes restrictions on adding mailing addresses to a subset of the plurality of hosted mailing lists and wherein the established mailing list is one of the subset of the plurality of hosted mailing lists,
wherein the subscriber preference is at least one of: (a) "notify", wherein the mailing address may be added to the established mailing list as long as a notification is sent to the mailing address that the mailing address has been added to the established mailing list, (b) "invite", wherein the mailing address may not be added to the established mailing list and may be sent an invitation to join the established mailing list, and (c) "initiate", wherein the mailing address may not be added to the established mailing list and may not be sent an invitation to join the established mailing list, and
wherein the procedure defined by the subscriber preference is at least one of: (a) a "drop action" in case the subscriber preference is "initiate", wherein the drop action includes not adding the mailing address to the established mailing list, (b) a "drop or invite action" comprising one of the drop action and an "invite action" in case the subscriber preference is "invite", wherein the invite action includes sending an invitation to the mailing address to join the established mailing list, and (c) a "drop, invite or welcome action" comprising one of the drop action, the invite action, and a "welcome action" in case the subscriber preference is "notify", wherein the welcome action includes adding the mailing address to the established mailing list and sending a notification to the mailing address that the mailing address has been added to the established mailing list.

36. A method for processing a source mailing list, comprising the steps of:
comparing the source mailing list to an established mailing list, wherein the source mailing list includes a mailing address to which a sender desires to send a message and wherein the mailing address has a status and includes a plurality of characters;
when the mailing address is included in the established mailing list, making a preliminary determination to add the mailing address to a dynamic mailing list; and
when the mailing address is not included in the established mailing list, processing the mailing address according to a procedure defined by an add rule including: (a) an address rule including a string of at least one character, (b) a subscriber preference, wherein the subscriber preference includes at least one of: (i) a global subscriber preference including restrictions on adding mailing addresses to any of a plurality of hosted mailing lists and wherein the established mailing list is one of the plurality of hosted mailing lists; and (ii) a local subscriber preference which includes restrictions on adding mailing addresses to a subset of the plurality of hosted mailing lists and wherein the established mailing list is one of the subset of the plurality of hosted mailing lists, and (c) a list join rule which determines whether the mailing address is to be added to the established mailing list based on the status,
wherein the procedure defined by the add rule includes: (a) adding the mailing address to the established mailing list according to the address rule, and (b) processing the mailing address according to the subscriber preference and the list join rule, wherein the subscriber preference overrides the list join rule in case of a conflict between the subscriber preferences and the list join rule.

37. A system for building an established mailing list from a source mailing list by adding a mailing address from the source mailing list to the established mailing list, comprising:
a. a storage arrangement storing the source mailing list and an add rule, the source mailing list including the mailing address to which a sender desires to send a message, the add rule determining whether the mailing address is to be added to the established mailing list and including at least one of (i) an address rule, (ii) a list join rule, and (iii) a subscriber preference, wherein if the the add rule includes the subscriber preference, the subscriber preference includes at least one of (a) a global subscriber preference including restrictions on adding mailing addresses to any of a plurality of hosted mailing lists and wherein the established mailing list is one of the plurality of hosted mailing lists; and (b) a local subscriber preference which includes restrictions on adding mailing addresses to a subset of the plurality of hosted mailing lists and wherein the established mailing list is one of the subset of the plurality of hosted mailing lists; and b. a processing arrangement making a preliminary determination to add the mailing address to a dynamic mailing list when the mailing address is included in the established mailing list, and processing the mailing address according to the add rule when the mailing address is not included in the established mailing list.

38. The system according to claim 37, wherein the storage arrangement stores data corresponding to the mailing address, and wherein the add rule includes an address rule which determines whether the mailing address is to be added to the established mailing list as a function of the data.

39. The system according to claim 37, wherein the storage arrangement stores a status for the mailing address, and wherein the add rule includes a list join rule which determines whether the mailing address is to be added to the established mailing list as a function of the status.

40. The system according to claim 38, wherein the address rule includes a list owner rule and wherein the system also comprises a list owner interface for setting the list owner rule.

41. The system according to claim 39, wherein the system also comprises a list owner interface for setting the list join rule.

42. The system according to claim 37, wherein the add rule includes a subscriber preference that is stored by the storage arrangement, and wherein the subscriber preference includes restrictions on adding the mailing address to the established mailing list.

43. The system according to claim 39, wherein the status is one of:
  a. "active", wherein the mailing address is included in the established mailing list and is receiving messages,
  b. "inactive", wherein the mailing address is included in the established mailing list and is not receiving messages, and
  c. "not subscribed", wherein the mailing address is not included in the established mailing list,
wherein the processing arrangement:
  a. adds the mailing address to the dynamic mailing list when the status is active,
  b. does not add the mailing address to the dynamic mailing list when the status is inactive, and
  c. processes the mailing address when the status is not subscribed with at least one of the following actions:
    i. not adding the mailing address to the established mailing list,
    ii. sending an invitation to the mailing address to join the established mailing list, and
    iii. adding the mailing address to the established mailing list.

44. The system according to claim 42, further comprising a subscriber interface for setting the subscriber preference.

45. A method, comprising:
a. storing a source mailing list using a recordable medium, the source mailing list including a mailing address to which a sender desires to send a message; and
b. transmitting the source mailing list for processing and generation of a dynamic mailing list,
wherein the dynamic mailing list is generated as a function of the source mailing list and an established mailing list,
wherein when the mailing address is included in the established mailing list, a preliminary determination is made to add the mailing address to the dynamic mailing list,
wherein when the mailing address is not included in the established mailing list, the mailing address is processed according to a procedure defined by an add rule for adding the mailing address to the established mailing list,
wherein the add rule includes at least one of: (a) an address rule, (b) a list ioin rule, and
(c) a subscriber preference, and
wherein if the add rule includes the subscriber preference, the subscriber preference includes at least one of: (a) a alobal subscriber preference including restrictions on adding mailing addresses to any of a plurality of hosted mailing lists and wherein the established mailing list is one of the plurality of hosted mailing lists; and (b) a local subscriber preference which includes restrictions on adding mailing addresses to a subset of the plurality of hosted mailing lists and wherein the established mailing list is one of the subset of the plurality of hosted mailing lists.

46. A method, comprising:
a. storing a source mailing list using a recordable medium, the source mailing list including a mailing address to which a sender desires to send a message; and
b. transmitting the source mailing list for processing and generation of a dynamic mailing list,
wherein the dynamic mailing list is generated as a function of the source mailing list and an established mailing list,
wherein when the mailing address is included in the established mailing list, a preliminary determination is made to add the mailing address to the dynamic mailing list,
wherein when the mailing address is not included in the established mailing list, the mailing address is processed according to a procedure defined by a subscriber preference which is not manipulable by the sender, and
wherein the subscriber preference includes at least one of:
(a) a global subscriber preference including restrictions on adding mailing addresses to any of a plurality of hosted mailing lists and wherein the established mailing list is one of the plurality of hosted mailing lists; and (b) a local subscriber preference which includes restrictions on adding mailing addresses to a subset of the plurality of hosted mailing lists and wherein the established mailing list is one of the subset of the plurality of hosted mailing lists.

47. A method, comprising:
a. receiving a dynamic mailing list; and
b. storing the dynamic mailing list using a recordable medium,
wherein the dynamic mailing list is generated as a function of a source mailing list and an established mailing list, the source mailing list including a mailing address to which a sender desires to send a message,
wherein when the mailing address is included in the established mailing list, a preliminary determination is made to add the mailing address to the dynamic mailing list,
wherein when the mailing address is not included in the established mailing list, the mailing address is processed according to a procedure defined by an add rule for adding the mailing address to the established mailing list, wherein the add rule includes at least one of: (a) an address rule, (b) a list join rule, and (c) a subscriber preference, and wherein if the add rule includes the subscriber preference, the subscriber preference includes at least one of: (a) a global subscriber preference including restrictions on adding mailing addresses to any of a plurality of hosted mailing lists and wherein the established mailing list is one of the plurality of hosted mailing lists; and (b) a local subscriber preference which includes restrictions on adding mailing addresses to a subset of the plurality of hosted mailing lists and wherein the established mailing list is one of the subset of the plurality of hosted mailing lists.

48. A method, comprising:

a. receiving a dynamic mailing list; and b. storing the dynamic mailing list using a recordable medium, wherein the dynamic mailing list is generated as a function of a source mailing list and an established mailing list, the source mailing list including a mailing address to which a sender desires to send a message, wherein when the mailing address is included in the established mailing list, a preliminary determination is made to add the mailing address to the dynamic mailing list, wherein when the mailing address is not included in the established mailing list, the mailing address is processed according to a procedure defined by a subscriber preference which is not manipulable by the sender, and wherein the subscriber preference includes at least one of: (a) a global subscriber preference including restrictions on adding mailing addresses to any of a plurality of hosted mailing lists and wherein the established mailing list is one of the plurality of hosted mailing lists; and (b) a local subscriber preference which includes restrictions on adding mailing addresses to a subset of the plurality of hosted mailing lists and wherein the established mailing list is one of the subset of the plurality of hosted mailing lists.

* * * * *